AUTOMATIC TELEPHONE SWITCHING SYSTEM

Filed April 5, 1948 11 Sheets-Sheet 1

INVENTORS
HOWARD G. DUHAMEL
RAYMOND A. REED
EDWARD O. CAMPBELL
BY Percy P. Lantzy
ATTORNEY

AUTOMATIC TELEPHONE SWITCHING SYSTEM

Filed April 5, 1948 11 Sheets-Sheet 2

Inventors
HOWARD G. DUHAMEL
RAYMOND A. REED
EDWARD O. CAMPBELL

By Percy P. Lantzy
Attorney

AUTOMATIC TELEPHONE SWITCHING SYSTEM

Filed April 5, 1948 11 Sheets-Sheet 3

INVENTORS
HOWARD G. DUHAMEL
RAYMOND A. REED
EDWARD O. CAMPBELL
BY
ATTORNEY

AUTOMATIC TELEPHONE SWITCHING SYSTEM

INVENTORS
HOWARD G. DUHAMEL
RAYMOND A. REED
BY EDWARD O. CAMPBELL
Percy P. Lantzy
ATTORNEY July 22, 1952 H. G. DUHAMEL ET AL 2,604,539

AUTOMATIC TELEPHONE SWITCHING SYSTEM

Filed April 5, 1948 11 Sheets-Sheet 5

To FIG. 4.

INVENTORS
HOWARD G. DUHAMEL
RAYMOND A. REED
BY EDWARD O. CAMPBELL
Percy P. Lantzy
ATTORNEY July 22, 1952 H. G. DUHAMEL ET AL 2,604,539

AUTOMATIC TELEPHONE SWITCHING SYSTEM

Filed April 5, 1948 11 Sheets-Sheet 6

INVENTORS
HOWARD G. DUHAMEL
RAYMOND A. REED
EDWARD O. CAMPBELL
BY Percy P. Lantzy
ATTORNEY July 22, 1952 H. G. DUHAMEL ET AL 2,604,539

AUTOMATIC TELEPHONE SWITCHING SYSTEM

Filed April 5, 1948 11 Sheets-Sheet 7

INVENTORS
HOWARD G. DUHAMEL
RAYMOND A. REED
EDWARD O. CAMPBELL
BY Percy P. Lantzy
ATTORNEY

AUTOMATIC TELEPHONE SWITCHING SYSTEM

Filed April 5, 1948

INVENTORS
HOWARD G. DUHAMEL
RAYMOND A. REED
EDWARD O. CAMPBELL
BY Percy P. Lantzy
ATTORNEY July 22, 1952 H. G. DUHAMEL ET AL 2,604,539

AUTOMATIC TELEPHONE SWITCHING SYSTEM

Filed April 5, 1948 11 Sheets-Sheet 9

INVENTORS
HOWARD G. DUHAMEL
RAYMOND A. REED
EDWARD O. CAMPBELL

BY Percy P. Lantzy

ATTORNEY

July 22, 1952 H. G. DUHAMEL ET AL 2,604,539

AUTOMATIC TELEPHONE SWITCHING SYSTEM

Filed April 5, 1948 11 Sheets-Sheet 10

INVENTORS
HOWARD G. DUHAMEL
RAYMOND A. REED
BY EDWARD O. CAMPBELL
Percy P. Lantzy
ATTORNEY

AUTOMATIC TELEPHONE SWITCHING SYSTEM

Filed April 5, 1948 11 Sheets-Sheet 11

INVENTORS
HOWARD G. DUHAMEL
RAYMOND A. REED
BY EDWARD O. CAMPBELL
Percy P. Lantzy
ATTORNEY Patented July 22, 1952 2,604,539

UNITED STATES PATENT OFFICE 2,604,539

AUTOMATIC TELEPHONE SWITCHING SYSTEM

Howard G. Duhamel, Verona, N. J., Edward O. Campbell, Flushing, N. Y., and Raymond A. Reed, Rutherford, N. J., assignors to Federal Telephone and Radio Corporation, New York, N. Y., a corporation of Delaware Application April 5, 1948, Serial No. 19,026

30 Claims. (Cl. 179—18)

This invention relates to new and useful improvements in automatic switching systems and is more particularly related to the register link and register circuits which receive the impulses from the subscriber's dial and control the establishment of the desired connection in accordance with these impulses.

An automatic telephone system for use in small communities which employs register link and register circuits of the type to which this invention relates is fully described in co-pending patent application Serial No. 19,024 filed April 5, 1948, now abandoned.

In such small community automatic systems, the call number consists of four digits, the first three of which designate the line number which identifies the location of the line in the final selector terminal banks. The fourth digit designates the type of ringing current to be sent over the called line to a multi-party line.

According to one feature of the invention the digit pulses of the first digit of the call number are recorded in both the register link and the register while the pulses of the second and third digits are recorded in the register only and absorbed in the register link by the recording switch which takes but one step for each digit.

Another feature of the invention utilizes the setting of a switch in the register link in accordance with the digit pulses of the first digit to determine whether a trunk link or a local link is to be used in the establishment of the connection.

Another feature employs the dial pulses of the first digit to determine whether the connection can be established through the final selector of the connecting local or trunk link directly or whether the final selector is to be used as a group selector to select a final selector associated with a connecting link serving the called lines.

Another feature employs the dial pulses of the fourth digit of the call number to set a switch in the register link to enable the link to supply the proper ringing current to a called party on a multi-party line.

If the selected line is found to be busy when the register makes the line test another feature provides for sending busy tone to the calling subscriber from the register link.

When multi-party lines are served by the community automatic telephone system provision must be made for revertive calls. A feature of this invention provides a test made by the register to determine if a selected busy line is the same line as the calling line. If such is the case, the register adjusts the register link so that reverting tone can be sent to the calling party to notify him that he is calling a party on the same line as his own and to hang up. The register link then proceeds to ring the called party and the link disconnects all switches connected to the line and talking battery is supplied from the line circuit.

A feature of this invention provides for the adjustment of the revertive impulse control circuit by means of which the register controls the movement of the selector switches so that, on units selection, either battery or ground pulses are counted by the register depending upon the recording of an odd or even numbered units digit in the register.

The above mentioned and other features and objects of this invention and the manner of obtaining them will become more apparent and the invention will be best understood, by reference to the following description of an embodiment of the invention taken in conjunction with the accompanying drawings which show the register link and register circuits in detail and the related switching apparatus in block diagram form, wherein:

Fig. 3 shows the complete register link circuit when

Fig. 4 shows the complete register circuit when

For a more complete description of the operation of the entire system of which the register link and register are a part, reference is made to the above mentioned co-pending patent application.

GENERAL

Figure 1:
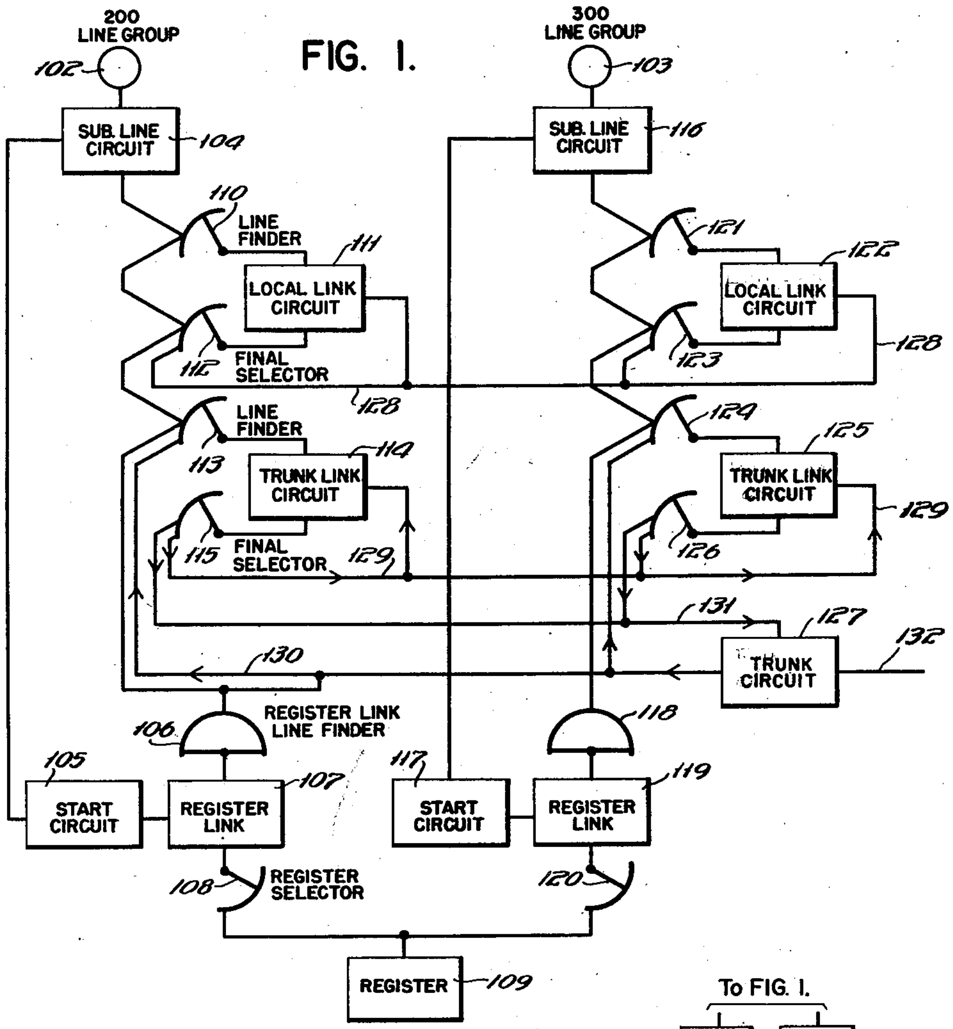
Fig. 1 shows the general arrangement of the switches and various circuits of the system in block diagram form.

Fig. 1 illustrates diagrammatically the system serving 200 lines. The well known 100-point power driven switch having seven brushes is employed as a register link line finder 106, a line finder 110 and a final selector 112. A register link circuit 107 employs, in addition to the line finder 106, a rotary step-by-step switch 108 to select an idle register 109. Each local link circuit 111 has a line finder 110 and the final selector 112. All seven brushes are used on the line finder but only four of the brushes in the final selector are used for calls within the 100 line group served by the associated local link. On calls to other hundred line groups the other three brushes and one of the first four mentioned of the final selector are employed. Access to the local link 111 may be had from the other local links 122 over a three-wire circuit 128.

Trunk links 114 and 125 are employed which are similar to the local links 111 and 122 except that they contain metallic transmission circuits without battery supply, whereas the local links supply battery through a condenser feed bridge. Two-way interoffice trunk circuits 127 are employed which terminate in a six conductor circuit, three of which are used for the line circuit at final selectors of the trunk link circuits 114 and 125 while the other three serve for hunting purposes at the terminals of the line finders 106 and 113.

The arrows in Fig. 1 indicate the direction of the calls. For installations up to 100 lines only the line finders 106, 110 and 113, the final selectors 112 and 115, links 107, 111 and 114, register selectors 108, registers 109 and two-way trunks 127 need be provided in sufficient quantites to satisfy traffic requirements. An installation for 200 lines does not require duplication of all equipment but the lines of this group 103 need their own line finders 118, 121 and 124 and final selectors 123 and 126, with appropriate local and trunk links 122 and 125 and register links 118, which may be connected with registers 109 via register selectors 120. It will be understood, of course, that while 200 lines have been referred to in this embodiment by way of example only, many more 100 line groups are contemplated. The two-way trunk circuits like 127 are accessible to all the groups over the multiple 131. These trunk circuits 127 terminate in conductors 130 on the banks of the line finders 106 and 113. They require line numbers but no line circuits. The line numbers of the trunk circuits need not be consecutive.

When the subscriber 102 belonging to the 200 line group calls, the line relay energizes the start circuit 105 which starts the line finders 106 of all the idle register links 107 serving the 200 group of lines and places test potential on the test terminals of the register link line finders 106. The line finders 106 of the register links like 107 hunt together and when one finds the calling line, the line cutoff relay is energized and the energizing condition is withdrawn from the start circuit which removes the test potential from the test terminals. As soon as the line finder 106 of a register link 107 finds the line, an idle register 109 is selected by the register selector 108 and when the register is attached to the link 107, dial tone is transmitted from the link to the calling line 102.

The subscriber now dials the call number and dial pulses are repeated by a relay in the register link 107 not only to the register circuit 109 but to a rotary switch, called the link marker switch, in the register link 107. Impulses of the first digit position the link marker switch. The first digit dialed is the hundred's digit of a local line number or the single code digit for a trunk.

If the hundreds digit designates the same group of 100 lines, in which the calling line is located, three relays are operated that adjust the link 107 to signal the register 109 that final selection is not to be made in accordance with the hundred's digit and the local link 110, 111 and 112 is selectively operated to connect calling with the called line.

If the hundred's digit designates some other group, e. g. 300 line group, two of the three relays are operated and the register is signaled to selectively operate the final selector 112 as a group selector to select the group of trunks in accordance with the hundred's digit and to hunt for an idle trunk 128 leading to a final selector in the desired 100 line group. The selected final selector in this example would be one like 122 and it is then operated to select line 103 in the 300 line group.

If the hundred's digit designates an unequipped group, the register link 107 releases and the line is locked out.

If a code is dialed, another relay is operated which adjusts the register link 107 to start line finder 113 of a trunk link 114 and to use the final selector 115 to hunt for an idle two-way trunk circuit 127.

All of the selectors are controlled by the register on a local call. The tens and units digits are not registered in the register link 107 but the above mentioned link marker switch in the link is arranged to move to position 9 after the first digit is dialed and the above operations take place provided that digit signifies a local line. Provision is made for release when the digit designates an unequipped 100 line group. Thus positions 10 and 11 of the link marker switch absorb the tens and units digits.

After the first digit has been dialed, the line finders 110 of the idle local links 111 or 113 of the trunk links 114, designated by the dialing of the first digit as above described, are started and one of them seizes the calling line.

A fourth digit is dialed by the calling subscriber to select the called station in a ten party ringing system. This moves the link marker switch in the register link 107 to a position for connecting the proper ringing current to the link for ringing the bell of the desired party.

When the called subscriber answers, the register link 107 is disconnected and the local link supplies battery for conversation. If the called subscriber's line is busy, busy tone is supplied from the register link 107. The called line is tested by the register 109 which signals the register link that the called line is busy or idle.

On an inward call the two-way trunk 127 obtains the register link 107 and the dial pulses are recorded as above described. On such calls a trunk link 114 is used on account of the transmission battery supply but the operation is substantially the same as above.

Reverting calls should be recognized by the calling party line subscriber because he dials his own number followed by the station digit for the desired party on his line. However, busy tone is sent to the calling party and the link 107 is signaled when register 109 finds by test that the called line is the same as the calling line. A special reverting tone is then connected to the calling subscriber's line and ringing is controlled in the register link 107, the local link 111 is disconnected when the called party answers and transmission battery is supplied through the line and lockout relays and the register link 107 is disconnected.

DETAILED DESCRIPTION

Figure 2:
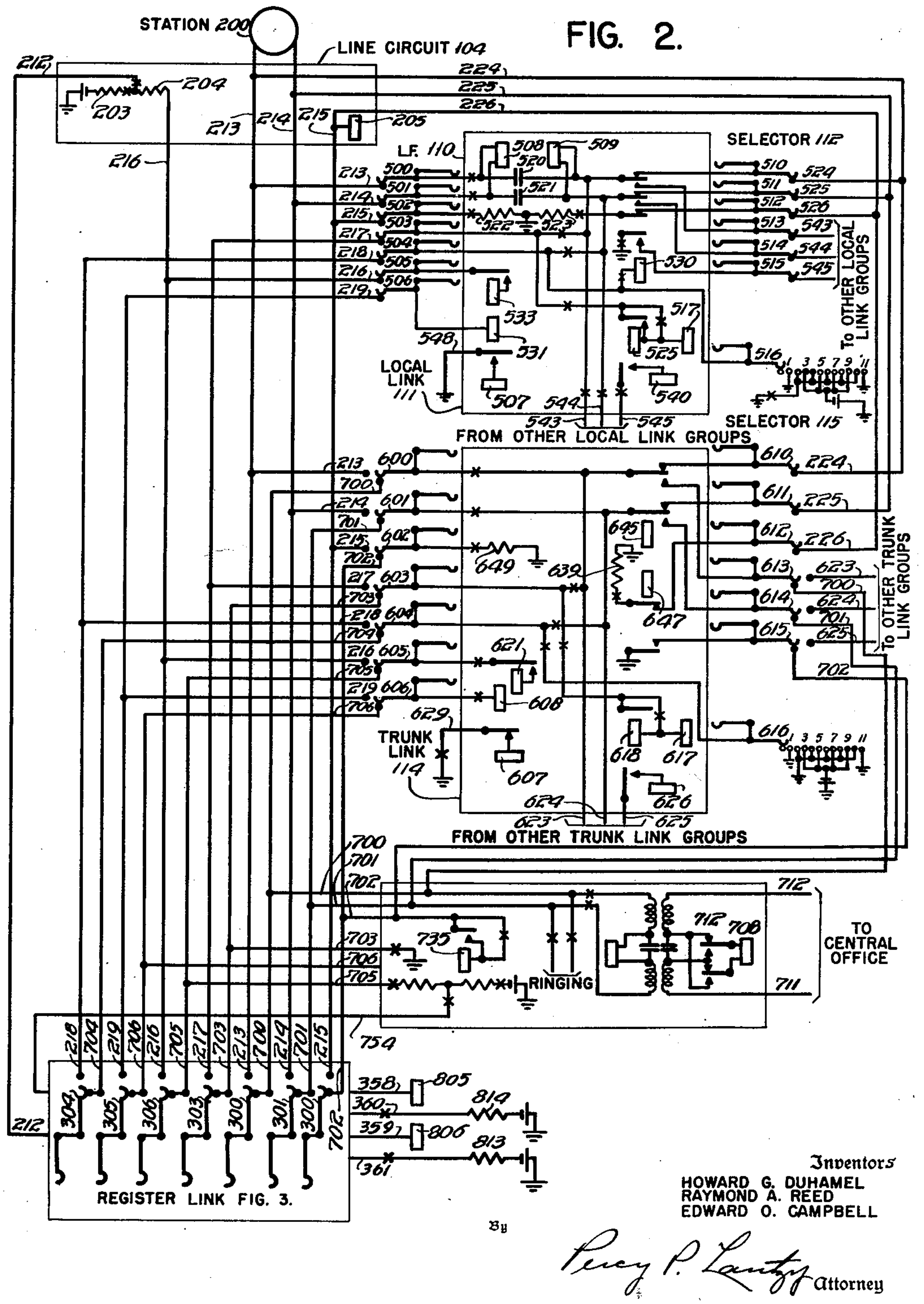
Fig. 2 shows the relation of the portions of other circuits of the system to the register link and register circuits.
Figure 3A:
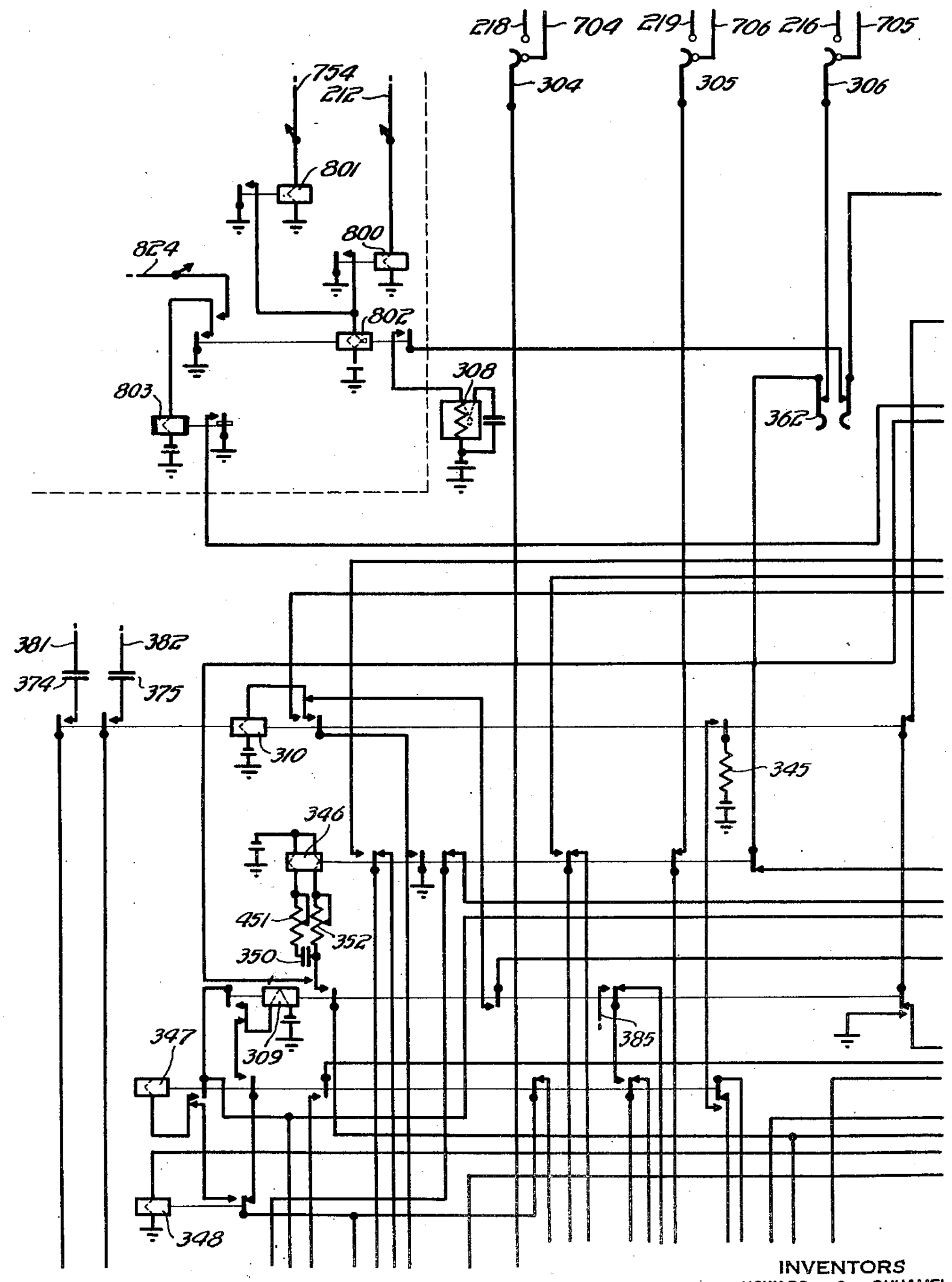
Figs. 3*a*, 3*b*, 3*c*, 3*d* and 3*e* are placed together in accordance with Fig. 6.
Figure 3B:
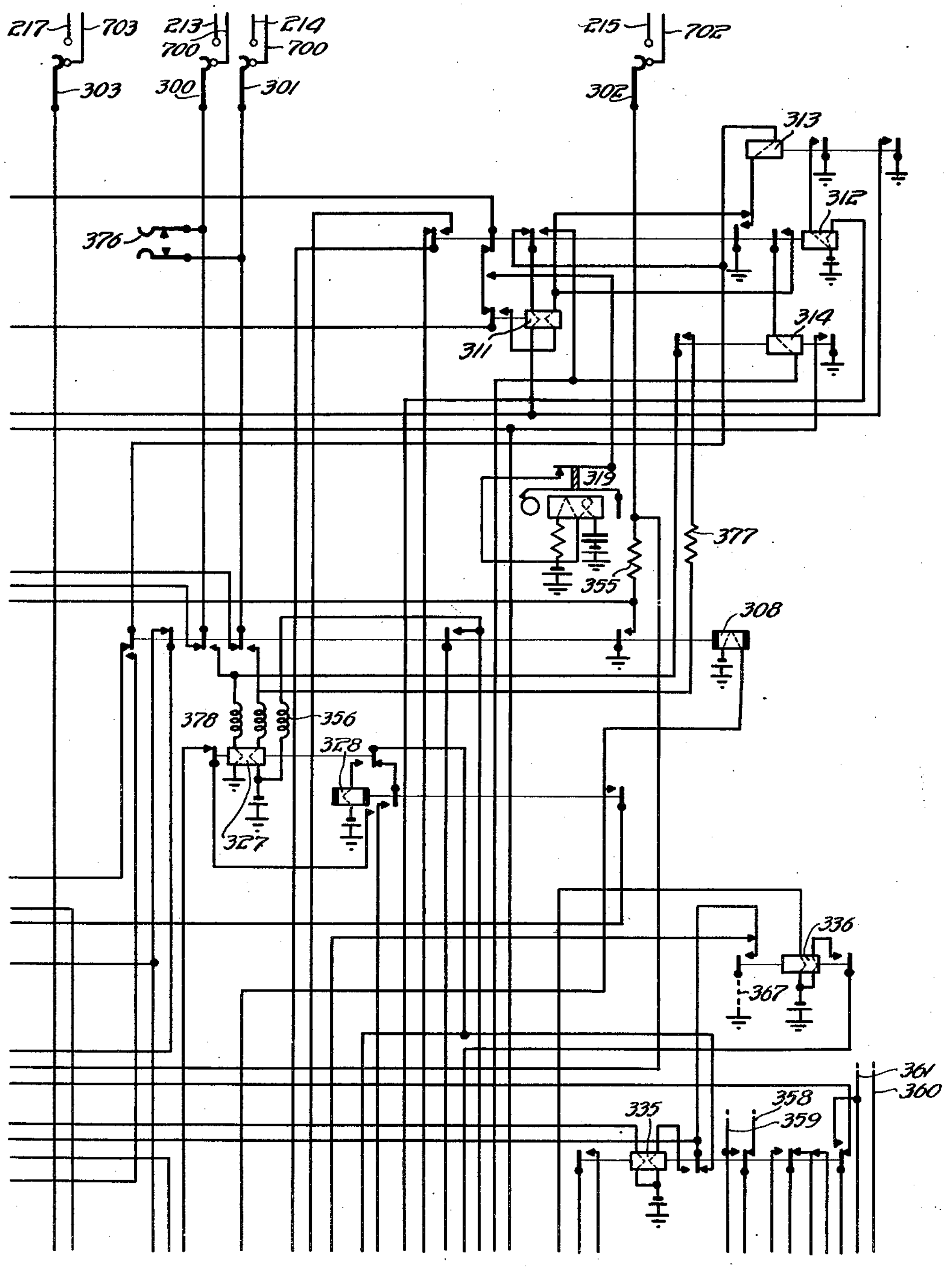
Figure 3C:
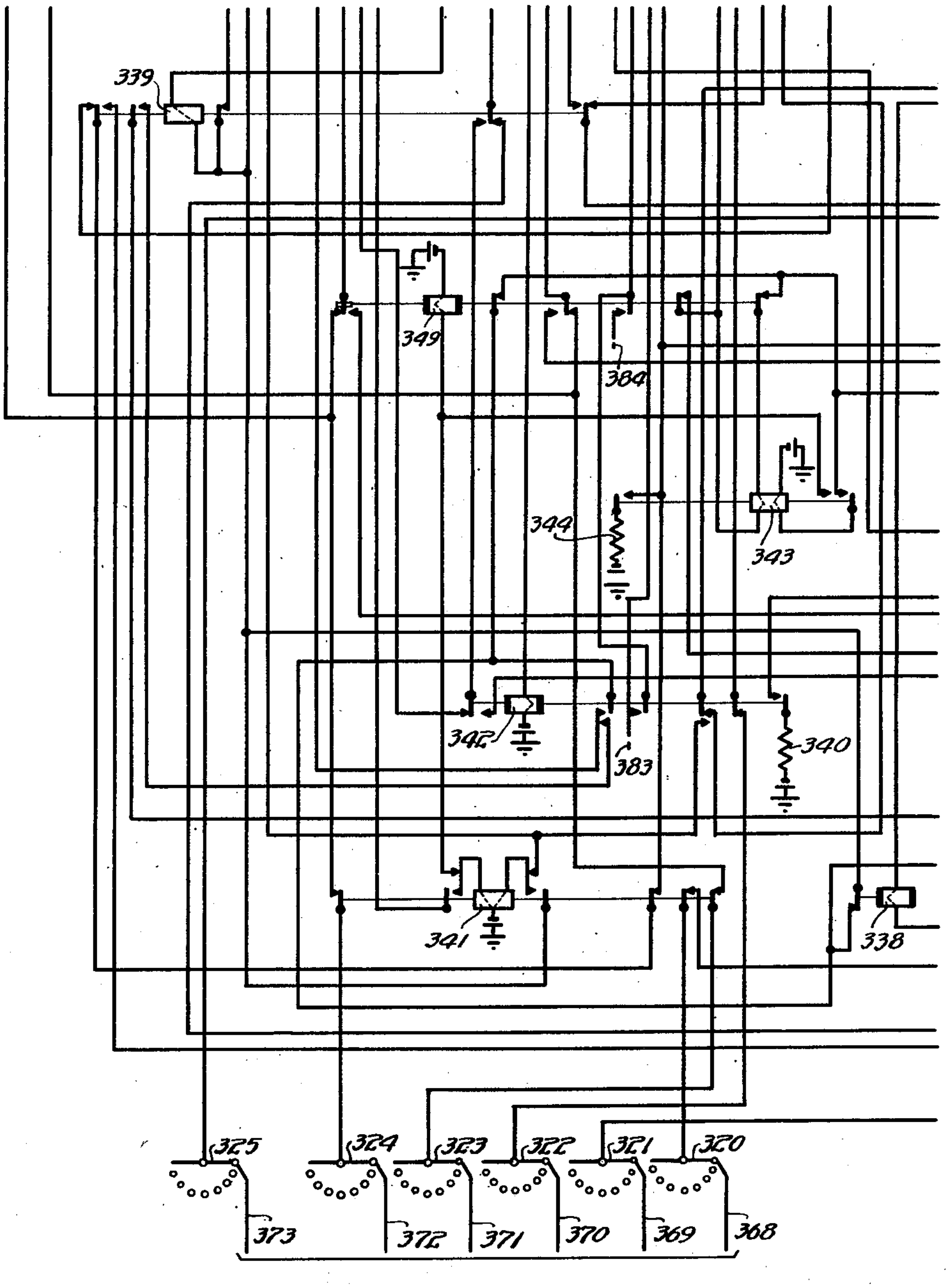
Figure 3D:
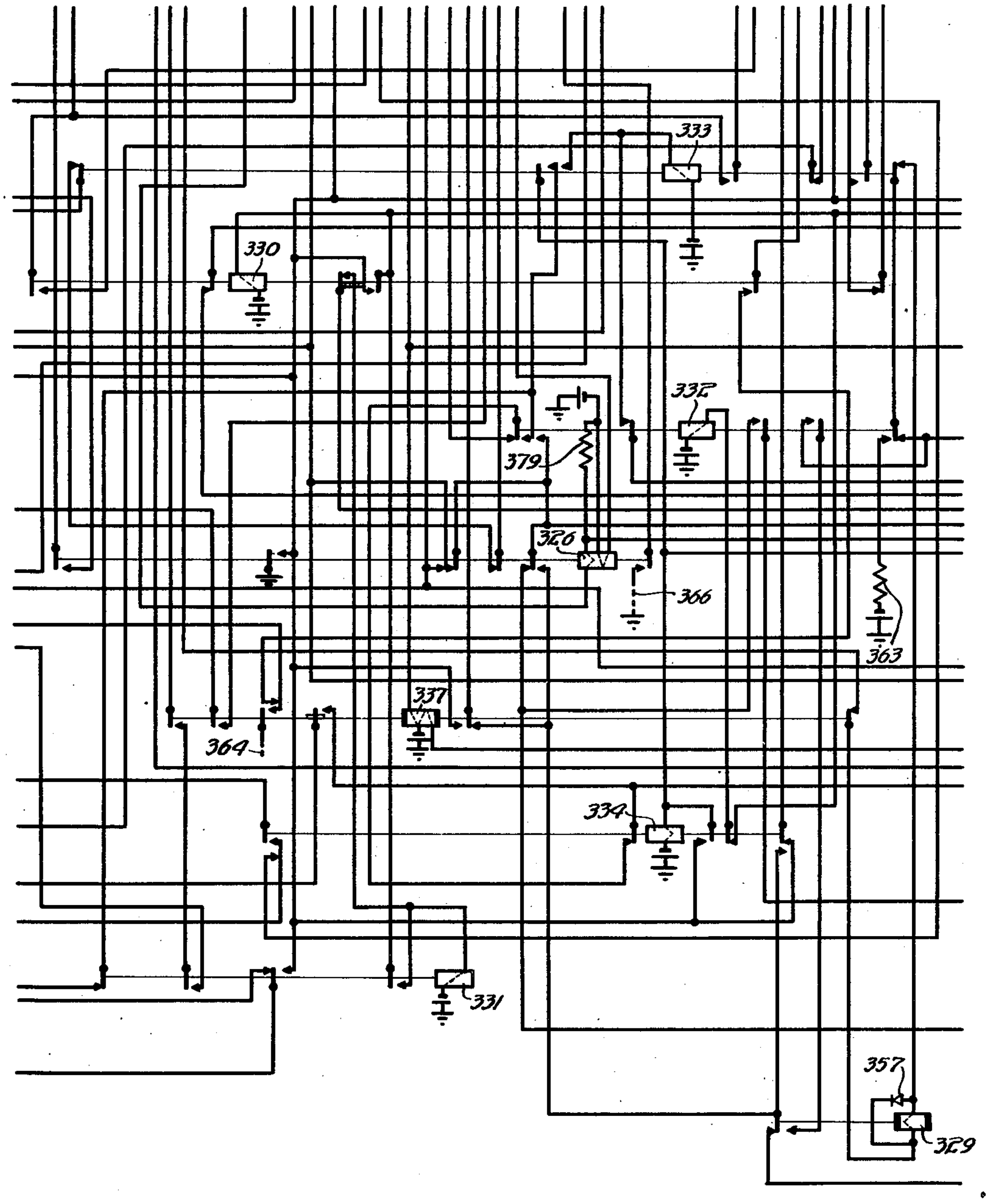
Figure 3E:
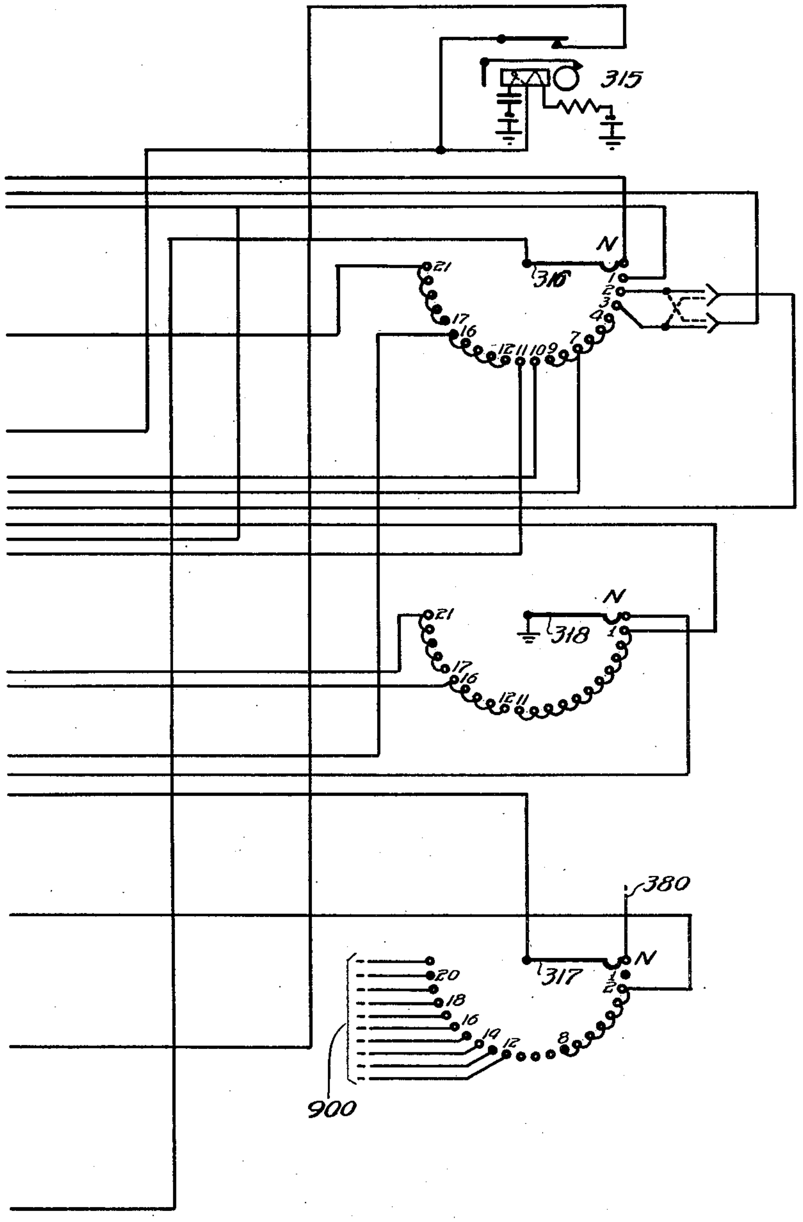

The attached drawings show the circuits for establishing the connections described above in general terms with reference to Fig. 1. Fig. 2 shows the apparatus of the line, local link, trunk link and two-way trunk circuits with which the register link of Fig. 3 and the register of Fig. 4 cooperate in the establishment of connections. The reference numbers are the same as shown in the above mentioned patent application to enable the tracing of the circuits. The conductors to the ringing generator and various tone transformers and interrupters shown in Fig. 9 of the previously mentioned patent application are designated on Figs. 3 and 4 and their purpose is given in the following description. The contacts of a given relay are related by a fine line to the relay winding which controls them.

The description is divided into sections as follows:

A—Local call to line of same line group—
1. Register link and register attached
2. Connection to register
3. Reception of the first digit
4. Local line finder attached
5. Reception of second and third digits
6. Tens selection
7. Units selection
8. Testing called line
9. Reception of ringing digit
10. Ringing the called subscriber, answer and release of connection B—Local call to line in a different line group—
1. Local line finder attached
2. Hundred's selection
3. Tens and Units selections
4. Test of called line ringing, answer and release C—Revertive call D—Outgoing call to operator E—Incoming call from operator—
1. Reception of the first, second and third digits
2. Ten's selection of a called line in the same hundred's group
3. Unit's selection
4. Test of called line
5. Called line tests free
6. Called line tests busy
7. Ringing
8. Call to a line in a different line group F—Time release

*A—Local call to line of same line group*

1. REGISTER LINK AND REGISTER ATTACHED

When the subscriber at station 200 raises his receiver from the switchhook, the line relay (not shown) associated with his line circuit is operated and connects battery through resistances 203 and 204 to relay 800 of Fig. 3. A test potential from battery through resistance 203 is connected to conductor 216.

Referring to Fig. 3, relay 800 operates relay 802. Relay 802 closes the circuit over conductor 824 for starting the motor. Relay 803 operates slowly to allow time for the motor to get up to full speed and drive the line finders of the free register links from the terminals, on which they are standing to enable succeeding calls on the same line to obtain different line finders.

Relay 802 closes the circuits for the clutch magnets 308 of all free register link line finders, one of which is shown in Fig. 3. This circuit may be traced from battery, winding of magnet 308, contact of relay 802, contact of jack 362, back contacts of relays 312, 311, 310, 309 and 308, normal terminal and wiper 318 of the link marker switch to ground. All free link line finders rotate, hunting for the calling line. When test potential on conductor 216 is encountered by a brush 306, relay 311 operates over its left hand winding in a circuit from battery, resistance 203 (see Fig. 2), conductor 216, brush 306, contact of jack 362, back contacts of relays 346, 308 and 312, left hand winding of relay 311 to ground at a contact of relay 803. The operation of relay 311 releases clutch magnet 308, and connects ground from wiper 318 of the link marker switch, contacts of relays 308, 309, and 310, front contact of relay 311, right hand winding of relay 311, contact of relay 312, winding of relay 313 in parallel with the operating winding of relay 311. Relay 313 operates relay 312 which connects ground directly to the winding of relay 313.

The low resistance of the right hand winding of relay 311 and the winding of relay 313 reduces the test potential on conductor 216 to such an extent that no other test relay 311 can operate in parallel with the first relay 311 that operates. If a double test should occur, i. e. two line finders test the same line at the same time, there is insufficient current to hold both relays 311 or to operate the relay 313. The first relay 311 to release removes its low resistance shunt allowing the other test relay 311 to hold. The former circuit remains normal and waits for the next call. The operation of cutoff relay 205 operates the lockout and line relays, not shown, and battery through resistances 203 and 204 is disconnected from conductors 212 and 216. Relays 800, 802 and 803 release stopping all the other line finders.

2. CONNECTION TO REGISTER

When the brush 306 finds the calling line and relay 313 operates, relay 312 operates in an obvious circuit. This releases relay 311 and connects ground from wiper 318 of the link marker switch, back contacts of relays 308, 309, 310, 311 and a front contact of relay 312 to stepping magnet 319 to cause the register selector to hunt for a free register. Test potential from battery, resistance 403 (see Fig. 4) back contact of relay 400, wipers 406, 409 and 412, in their normal positions, back contact of relay 400, make busy jack 444, conductor 373, when encountered by register selector wiper 325, back contacts of relays 333 and 326, a front contact of relay 312, left hand winding of relay 311, a front contact of relay 313 to ground, operates relay 311. The operation of relay 311 opens the circuit for stepping magnet 319 to stop the register selector. When the double test condition is satisfied as already explained, and relay 311 holds, low resistance relay 314 operates.

Relay 314 operates relay 326 and connects resistance 377 across the winding of relay 327 which operates. A front contact of relay 326, supplies ground for operating relay 328 through back contacts of relays 336, 335 and a front contact of relay 327. Relay 328 operates relay 308 from ground, a front contact of relay 326, back contacts of relays 335, 333 and 338, front contact of relay 328, winding of relay 308 to battery. This ground is extended through the front contact of relay 328 to the left hand winding of relay 326, resistance 379 to lock relay 326. The operation of relay 308 opens the circuit of relay 313 to brush 306 which releases relays 313, 312 and consequently relays 311 and 314. A contact of relay 308 connects ground through resistance 355 to brush 302, conductor 215 (see Fig. 2), to operate relay 205. This operates the lockout relay, not shown, in the line circuit, which disconnects battery through resistance 203 from conductor 216 at the line finder and from conductor 212 through resistance 204 to the start circuit (Fig. 3).

Figure 4A:
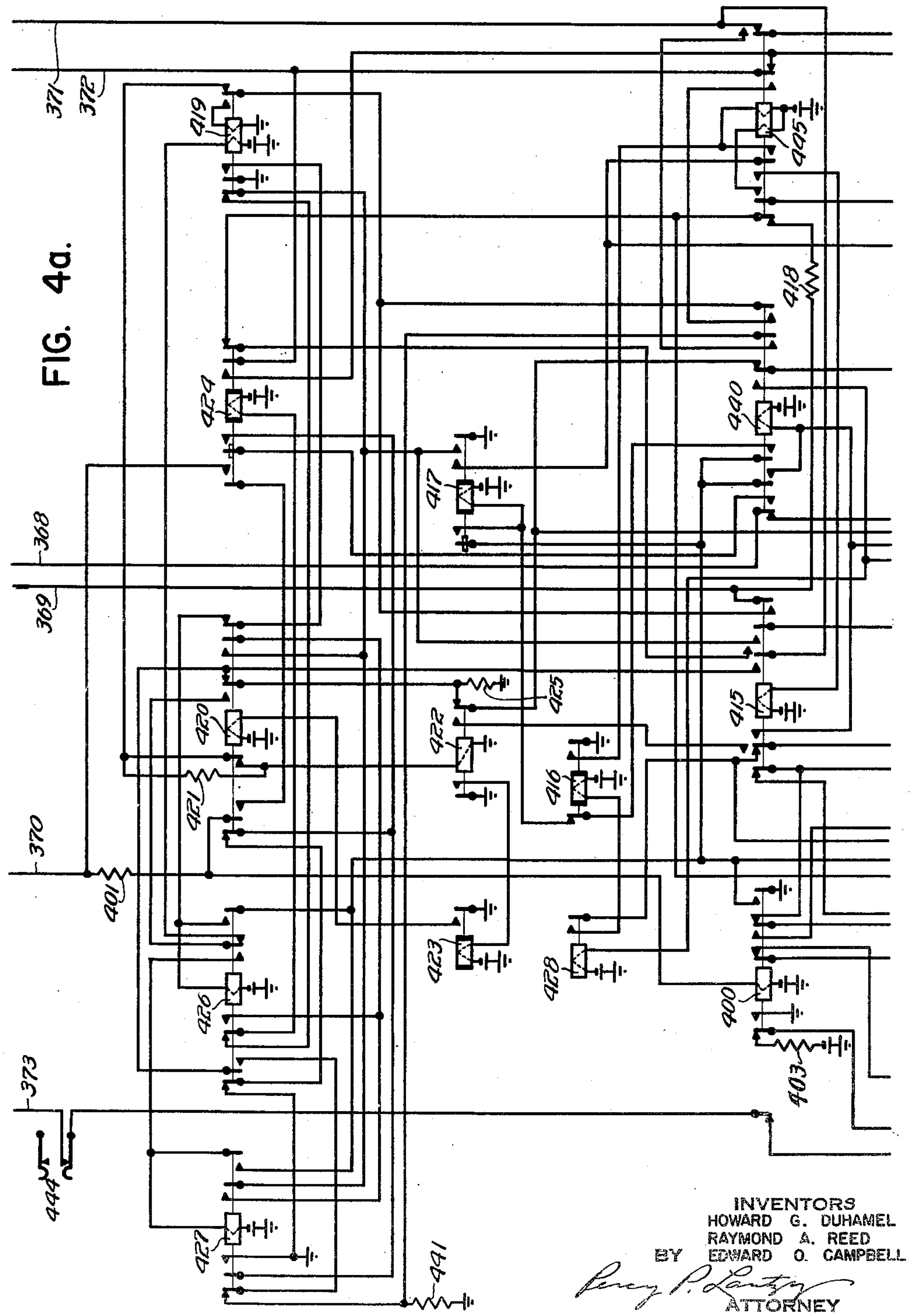
Figs. 4*a*, 4*b* and 4*c* are placed together as shown in Fig. 6.
Figure 4B:
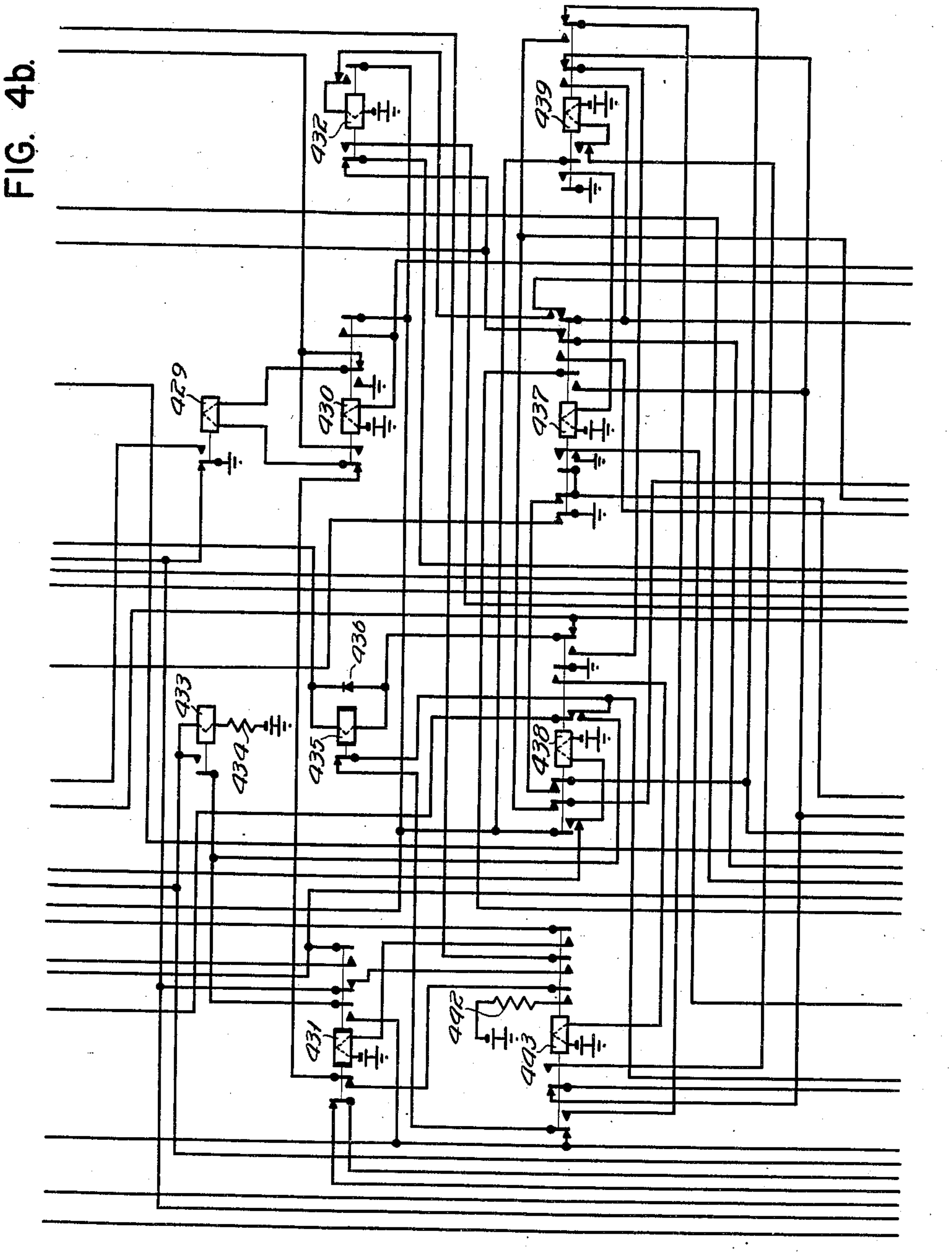
Figure 4C:
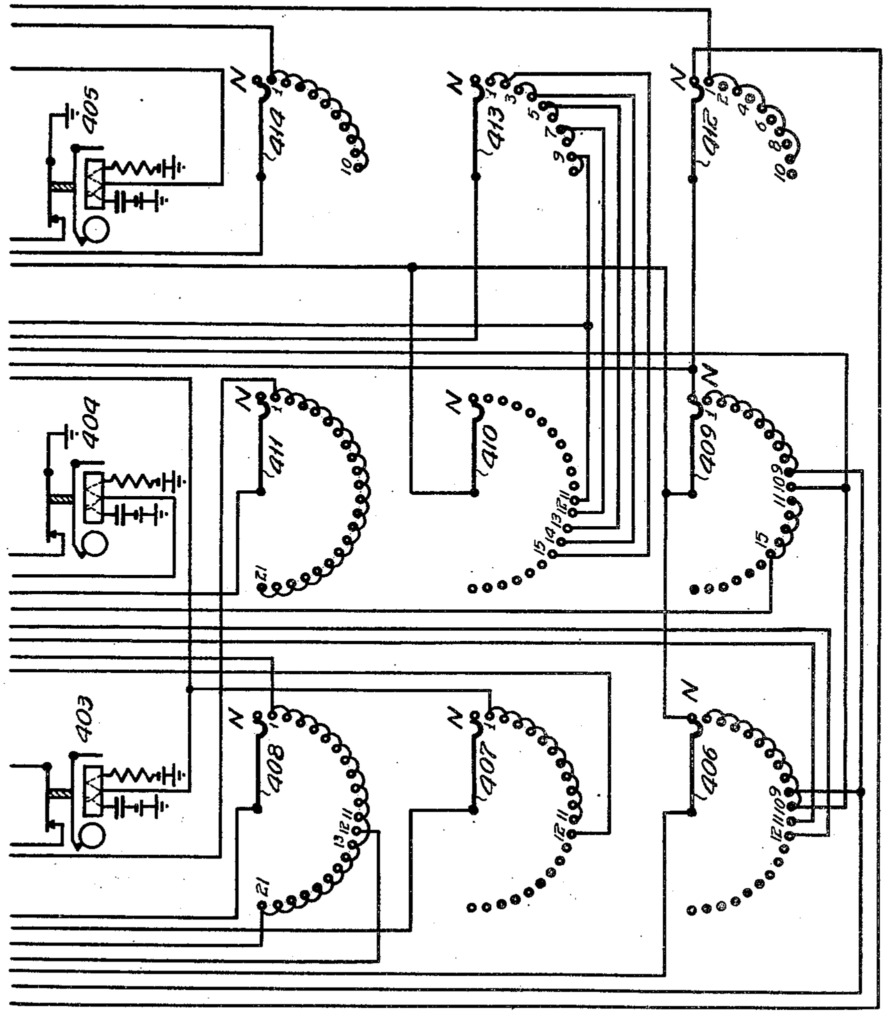

Relay 326 completes a circuit from ground, a front contact of relay 326 and a back contact of relay 349, left hand winding of relay 343, back contact of relay 347 and 342, wiper 322 of the register selector, conductor 370, resistance 401, winding of relay 400 to battery in the register circuit (Fig. 4). Resistance 401 prevents the operation of relay 343 at this time and relay 400 operates. Relay 308 also connects the windings of relay 327 through the windings of tone transformer 378, brushes 300 and 301 to line conductors 213 and 214. Dial tone is sent to the calling subscriber by tone coil 378 the primary winding 356 of which is connected to the dial tone transformer, not shown, conductor 380, wiper 317 of the link marker switch, through back contacts of relays 334 and 332, and a front contact of relay 308. The system is now ready to receive dial pulses.

3. RECEPTION OF THE FIRST DIGIT

It is assumed that subscriber 200 makes a call to a line in the same line group by dialing call number 2341. As mentioned previously, the first digit dialed determines whether a local or trunk link is required and whether or not the called line is in the same group of subscribers' lines as the dialing line. If the local line is one of the same group, group selection directed by the first or hundred's digit must be suppressed. If it is a line of some other hundred's group, the final selector associated with the local line finder is used as a group selector and the first digit dialed directs it to an idle trunk to a final selector in the desired hundred's group. In either case a local link is used and the line finder thereof is connected to the calling line by the register link. If the first digit dialed designates an outgoing trunk call, a trunk link is used and the register link receives only the one digit and must be adjusted to selectively operate the final selector associated with the line finder of a trunk link to hunt for an idle trunk and to be satisfied without receiving any subsequent digits.

Referring to Fig. 3, the connections of relays 331, 330 and 333 to the terminals of wiper 316 are shown in solid lines for the register links serving the 200 line group. Relay 331 is connected through a back contact of relay 330 to terminal 2 and relay 330 is connected to terminal 3. For register links serving the 300 line group as shown by the dotted lines, relay 331 is connected to terminal 3 and relay 330 to terminal 2. Since hundreds' numbers 4 to 9 inclusive are not assigned, these terminals are connected together and to a back contact of relay 330 to short circuit the holding winding of relay 326 which releases. When this occurs the register link is returned to normal and the cutoff relay 205 (see Fig. 2) of the dialing subscriber's line circuit is released. The lockout relay and the line relay, not shown, are connected to the line, remain operated and a guard ground is connected to conductors 215 and 226 until the subscriber releases. Digit "0" designates a trunk call and relay 333 is connected to terminal 10 of wiper 316 through a back contact of relay 332 to record an outgoing call to the operator as will be described in section D.

The subscriber, upon hearing dial tone, commences to dial the assumed call number 2341. Relay 327 follows the dial pulses. Relay 328 being slow to release, remains operated during the train of impulses representing the digit. Each time relay 327 releases, ground from a front contact of relay 326, back contacts of relays 336, 335 and 327, front contact of relay 328, back contacts of relays 327 and 337, winding of relay 329 in parallel with rectifier 357, back contacts of relays 333 and 332, winding of magnet 315 of the link marker switch to battery. From the double make contacts of relay 328 this ground is also connected through back contacts of relays 334 and 341, wiper 320 of the register selector, conductor 368, back contact of relay 440 in the register circuit, winding of relay 435, and rectifier 436 in parallel, back contact of relay 438, winding of magnet 403 of the hundreds' marker switch. The link marker switch and the hundreds' marker switch in the register follow the dial pulses and take two steps. Wipers 316, 317 and 318 of the register selector step to the second terminals. Relay 329 in series with magnet 315 operates and holds while the pulses are being received.

At the end of the first digit, the position of the link marker switch corresponds to the number dialed. Relay 329 releases and connects ground from wiper 318 terminal 2, a front contact of relay 326, a back contact of relay 329, wiper 316 in position 2, back contact of relay 330, winding of relay 331 to battery. Relay 331 operates and extends this ground to operate relay 330 and, through a back contact of relay 334, to operate relay 332. A contact of relay 330 locks the three relays to ground at a front contact of relay 326.

The operation of relay 331 connects ground from a contact of relay 326 to wiper 321 of the register selector and over conductor 369, resistance 418 (see Fig. 4), back contact of relay 445, front contact of relay 443 to operate relay 431 in the register to cancel group selection when relay 443 operates after the hundred's marker switch has been positioned. The operation of relay 332 completes a circuit from ground, wiper 318 of the link marker switch, contacts of relays 332 and 334, wiper 317 and a contact of relay 332 to the interrupter contact of magnet 315 to step the link marker switch to position 9 as determined by wiper 317 by self-interruption.

As previously stated the release of relay 327 sends a pulse over wiper 320 of the register selector to operate magnet 403 in series with relay 435 and a contact of relay 438 in the register. The two pulses for the hundreds digit are recorded on the hundreds marker switch. Relay 435 operates on the first impulse and holds for the duration of the digit. When relay 435 releases at the end of the pulses, ground from a back contact of relay 437, interrupter contact of magnet 403 of the hundreds marker switch, back contacts of relays 435 and 443, wiper 408 of the hundreds marker switch, a front contact of relay 400, normally closed contact and winding of relay 438 to battery, operates relay 438 which locks to a contact of relay 400. Relay 438 transfers the instepping circuit including series relay 435 from magnet 403 to 404 via a back contact of relay 439 and operates relay 443 to open the restoring circuit for the hundred's marker switch and to operate relay 429 so as to allow selection to start immediately after the reception of the first digit, if required. This operation is coincident with the stepping of the link marker switch.

4. LOCAL LINE FINDER ATTACHED

When relay 330 operates, ground is connected to conductor 358 via back contact of relay 335, front contact of relay 330, back contacts of relays 346, 339, 338, 333 and 335 and front contact of relay 326. This operates relay 805 (see Fig. 2) to connect test potential from battery, resistance 814, conductor 360, front contact of relay 330, back contacts of relays 335, 339, 341 and 346, brush 305 of the link line finder, conductor 219, line finder brush 506 to operate relay 531 in the local link circuit 111 (see Fig. 2) when line finder brush 506 encounters this test potential. The line finder magnets 507 of the idle local links are energized when relay 805 operates from a ground via conductor 548. The details of this start circuit are not shown. Ground at a front contact of relay 326, back contacts of relays 335, 333 and 338, winding of relay 339, front contact of relay 308, back contact of relay 346, contact of jack 362, brush 306 of the link line finder, conductor 219, line finder brush 505 of the local link 111 (see Fig. 2) is connected to relay 533 which has been operated. Relay 339 operates in series with relay 533 and the line finder is now ready for the selective operation of the final selector.

5. RECEPTION OF SECOND AND THIRD DIGITS

The calling subscriber proceeds to dial the ten's and unit's digits while the line finder of the local link is being attached. The digits are recorded on the ten's and unit's marker switches in the register and the link marker switch takes one step for each digit.

When the subscriber dials the ten's digit, relay 327 releases three times. Relay 329 operates in the previously described circuit to battery through resistance 364 and a contact of relay 332 and holds for the duration of the pulses. When relay 329 operates, ground from brush 318 and contacts of relays 329 and 332 operate the link marker switch magnet 315. When relay 329 releases, the magnet releases and steps the link marker switch to position 10.

In the register, the stepping circuit from the contacts of relay 327 via wiper 320 of the register selector and conductor 368 operates relay 435 on the first impulse and by the operation and release of magnet 404, steps the ten's marker switch to position 3. When the pulses cease, relay 435 releases and completes a circuit from ground, a back contact of relay 437, interrupter contact magnet 403, a back contact of relay 435, a front contact of relay 443, a back contact of relay 439, wiper 411, a front contact of relay 443 and a back contact and winding of relay 439 to battery. Relay 439 operates and locks to ground from a contact of relay 400, to transfer the stepping circuit to magnet 405 of the unit's marker switch.

The unit's digit is received in the same manner as the ten's digit with the link marker switch stepping to position 11 and the unit's marker switch to position 4. When magnet 315 releases, ground via wiper 316 of the link marker switch in position 11 operates relay 334 which disconnect the stepping circuit from the register. Relay 332 releases to reconnect the link marker switch magnet to relay 327.

When relay 435 in the stepping circuit of the register releases at the end of the unit's pulses, relay 432 operates via brush 414 of the unit's marker switch and locks to ground from a contact of relay 400 to prepare the register circuit for unit's selection.

6. TEN'S SELECTION

After reception of the first digit, the register link connects ground to wiper 321 of the register selector, operates relay 431 as described in section A-3. Relay 431 opens the circuit of revertive pulse relay 429 and the fundamental ground to conductor 370 and wiper 323 to prevent operation of the final selector, removes ground from terminal 12 of brush 408 of the hundred's marker switch, and completes a circuit from ground, interrupter contact of magnet 404, front contact of relay 437, interrupter contact of magnet 403, front contacts of relays 438 and 431, wiper 408 of the hundred's marker switch, front contact of relay 431, back contact of relay 415, winding of magnet 403 to battery, to self-step the hundred's marker switch to position 12. This cancels the hundred's selection and prepares the circuit for ten's selection. Relay 431 remains operated for sufficient time to insure the stepping of the hundred's marker switch.

The revertive impulse control circuit is now closed from ground, a front contact of relay 400, wiper 406 and terminal 12 of the hundred's marker switch, front contact of relay 437, wiper 409, of the ten's marker switch in position 3, back contact of relay 431, front contact of relay 443, back contact of relay 445, conductor 371, wiper 323 of the register selector, back contacts of relays 341, 349 and 346, front contacts of relays 339 and 326, brush 303 of the link line finder, conductor 217, line finder brush 503 of the local link, winding of relay 525 to battery. Relay 525 operates and extends this ground to the selector clutch magnet 517 to rotate the selector.

Figure 6:
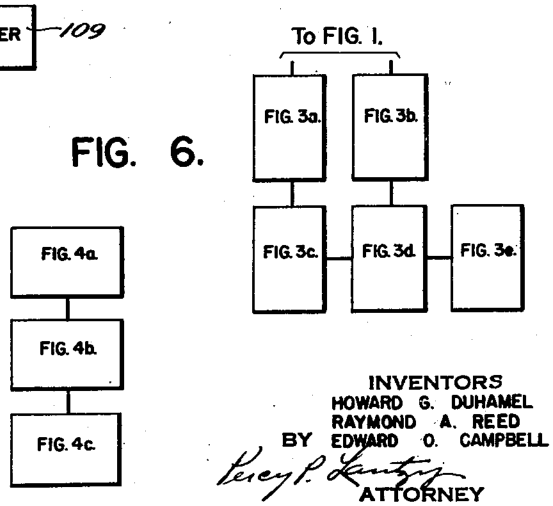
Fig. 6 shows how the portions of Figs. 3 and 4 should be placed together.

The numbering of the terminals in the selector banks for both the local and trunk links is shown on Fig. 6. These banks provide 51 positions including the normal position. As the brushes revolve, one set contacts with one set of terminals on the first half revolution and the other set contacts with the other set of terminals on the second half revolution. The bank terminals are, in effect, divided into two halves; an upper half, to which the subscriber's lines and incoming trunks are connected, and the lower half, to which the two-way outgoing trunks and the trunks to other hundreds' groups are connected. The test terminals are located between two halves. It will be noted that the terminals are numbered down beginning at the left, or with the movement of the brushes. This numbering arrangement makes it possible to step the wipers of the digits' marker switches forward a number of steps which is the tens complement of the position, in which the wipers are set by the dial pulses, i. e., the digit dialed.

Figure 5:
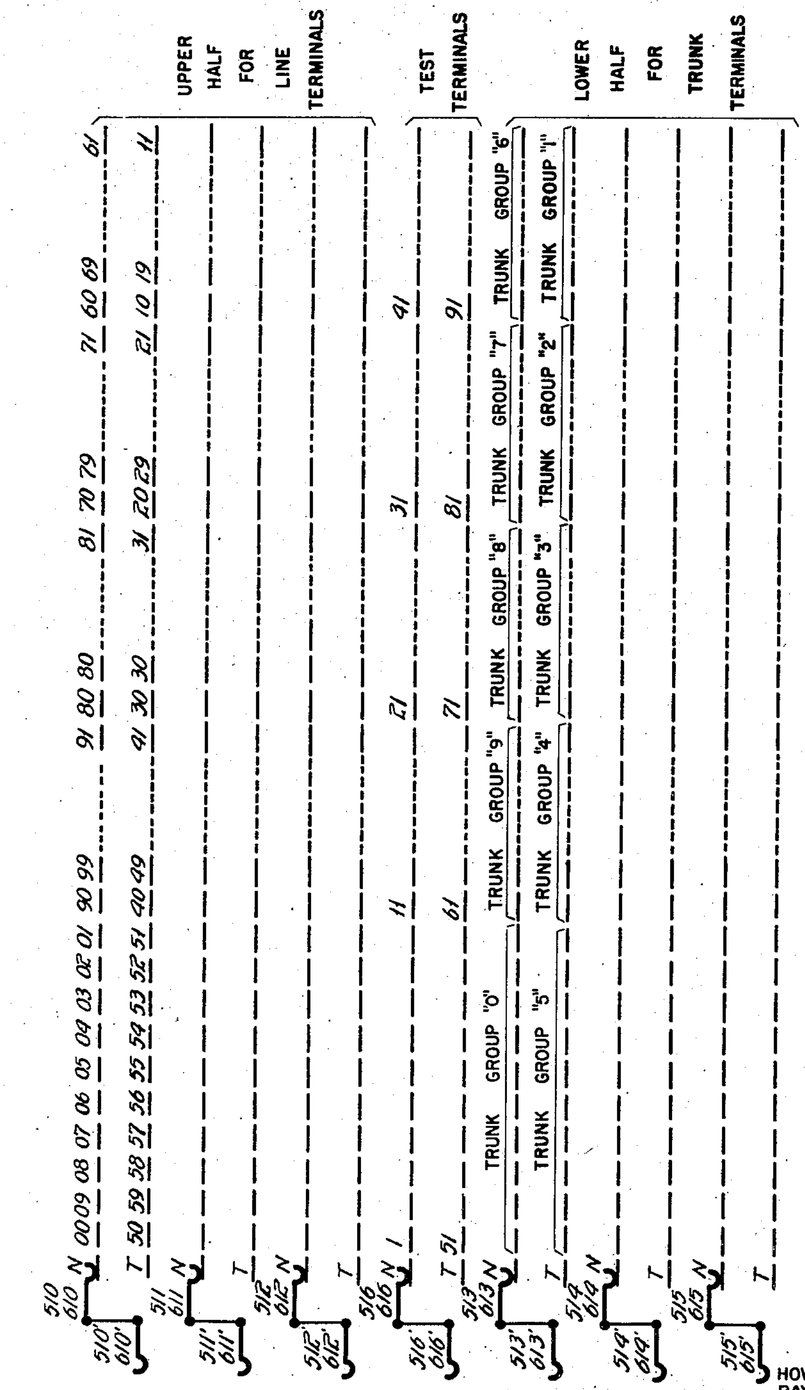
Fig. 5 shows the terminal arrangement and numbering of the selector banks.

For example, if a number 3 is recorded by dial pulses on one of the digits marker switches the switch will then take 7 steps under control of the revertive impulse circuit which will drive the brushes of the selector, as shown on Fig. 5, to the terminals numbered 3. More specifically, a brush identified as 516—616 is driven over the 10, 9, 8, 7, 6, trunk groups and the mate brush 516'—616' is driven over the 5 and 4 trunk groups to the first terminal of trunk group 3. Similarly, in the case of a line, the brush is driven to the terminal by a number of steps which is the tens complement of the terminal. Thus, brush 510'—610', if line 53 is to be selected, is driven 7 positions to line terminal 53 having been brought to rest on terminal 50 by the tens' selection.

Referring to Fig. 2, as the selector brushes rotate, ground from contacts 1, 11, 21, etc., brush 516, through the local link circuit, local line finder brush 504, conductor 218, link line finder brush 304, front contact of relay 339, back contacts of relays 342, 346, 349 and 341, wiper 324 of the register selector, conductor 372, back contacts of relays 445 and 430, winding of relay 429, back contacts of relays 430 and 431, a front contact of relay 443, resistance 442 to battery, operates relay 429 of the register circuit. Ground from the front contact of relay 429 operates magnet 404 of the ten's marker switch via a back contact of relay 415, wiper 407 position 12 of the hundred's marker switch, front contact of relay 437, magnet 404 to battery. Relay 433 is also operated in this circuit and locks from ground, interrupter contact of magnet 404, front contact of relay 437, interrupter contact of magnet 403 and front contacts of relays 438 and 433 to insure that magnet 404 will take one step for each revertive pulse, however short, is received.

In this illustration the ten's marker switch was set in position 3 by the dial pulses. When the ten's marker switch reaches position 10 after taking 7 steps, ground from a contact of relay 400, wiper 406 of the hundred's marker switch position 12, a front contact of relay 437, wiper 409 of the ten's marker switch position 10, winding of relay 428 to battery, operates relay 428. At this time brush 516' is moving from group 4 to group 3, i. e., from test terminal 61 to 71 (see Fig. 5). Ground is maintained on the fundamental circuit over conductor 371 at the back contact of relay 429 to hold relay 525 and magnet 517 in the local link. On the next operation of relay 429, magnet 404 is energized and relay 416 is operated through a front contact of relay 428 and a back contact of relay 415. Relay 525 and magnet 517 release and stop the selector brushes at test terminal 71 corresponding to line terminal 30 (see Fig. 5). Relay 445 operates from a contact of relay 415 and opens the circuit from wiper 324 via conductor 371 of the register selector to release relay 429. The release of relay 429 de-energizes magnet 404 stopping the ten's marker switch in position 11 and opens the circuit for relay 416. When the tens marker switch steps to position 11, relay 428 is released and a short time later relays 416 and 415 release in turn. The register circuit is then prepared for units selection.

7. UNIT'S SELECTION

When an odd number is dialed for the unit's digit, the units marker switch is stepped to an odd numbered position and ground from a contact of relay 400, wiper 406 position 12 of the hundred's marker switch, front contact of relay 437, wiper 410 position 11 of the ten's marker switch, front contact of relay 432, wiper 412 of the unit's marker switch operates relay 430 which locks to ground at a contact of relay 400. Relay 430 transfers the operating circuit for relay 429 to respond to revertive battery pulses for odd number unit digit selection. For even numbered units digits, relay 430 does not operate and relay 429 responds to revertive ground pulses.

The release of relay 445 at the end of ten's selection again connects ground to wiper 323 of the register selector and in this example responds to revertive ground pulses since the units digit dialed is "4" and the units marker switch is in position 4. The revertive impulse control circuit is now closed to conductor 217 and relay 525 and selector clutch magnet 517 of the local link 111 (see Fig. 2) are again operated and the selector brushes rotate. As the selector rotates, revertive battery pulses from selector brush 516, line finder brush 506, and conductor 218 operate relay 429.

The ten's marker switch is again stepped by relay 429 until relay 440 is operated. Magnet 404 operates from ground, front contact of relay 429 and back contact of relay 415, wiper 407 in position 12 of the hundred's marker switch, front contact of relay 437, magnet 404 to battery. Relay 440 operates from ground, a front contact of relay 400, wiper 406 in position 12 of the hundred's marker switch, front contact of relay 437, wiper 410 in position 14, in this example, of the ten's marker switch, wiper 413 in position 4 of the units marker switch, winding of relay 440 to battery. The operation of relay 440 connects ground, front contact of relay 400, wiper 406 position 12, front contact of relay 437, wiper 409 positions 11—15, a front contact of relay 440, to operate relay 428 and places the fundamental ground under control of relay 429 because ground remains connected to conductor 371 from back contacts of relays 429 and 431 and a front contact of relay 443.

Ground from front contacts of relays 400 and 440 and a back contact of relay 415 operates relay 417 which connects ground via back contacts of relays 419 and 426 to the winding of slow operating relay 424. The next operation of relay 429 from ground on brush 516 of the selector removes ground from conductor 371 to release relay 525 and magnet 517 and stop the selector. Relay 429 operates relay 416 via a front contact of relay 428. Relay 416 operates relay 445 in an obvious circuit and releases relay 429, closes a circuit from ground, winding of relay 422, back contacts of relays 420 and 419, front contacts of relays 440 and 445 to conductor 372 for testing the busy or idle condition of the called subscriber's line, and connects ground via resistance 441 and front contacts of relays 440 and 445 to conductor 371 for operating relay 525 but not magnet 517 of the final selector. Relay 445 locks to ground at a front contact of relay 417. The release of relay 429 releases relay 416.

8. TESTING CALLED LINE

When the final selector arrives at the terminals of a free non-P. B. X line, cutoff relay 205 is connected to relay 422 of the register via conductor 226, final selector brush 512 and finder brush 504 of the local link, conductor 218, finder brush 304 of the register link, wiper 324 of the register selector, conductor 372, front contacts of relays 445, 440, a back contact of relay 419 and winding of relay 422 to ground. Relays 205 and 422 operate in series.

As previously described, when relay 417 in the register circuit was operated at the end of units selection, a circuit was closed for the slow operating relay 424. The operation of relay 422 operates relays 423 and 420 in turn. When relay 424 operates after a time, resistance 401 is short circuited to operate relay 343 in the register link circuit when the ground shunt is removed by the operation of relay 331 and the pickup interrupter via conductor 364. Relay 343 locks to ground from a contact of relay 326 and operates relay 341 and 349. Relay 349 opens the circuit to relay 400 of the register circuit which restores.

If the called line is a busy individual or party line, the cutoff relay 205 is held operated by a resistance ground which prevents relay 422 from operating so that when the slow operating relay 424 finally operates, ground is connected from back contacts of relays 426 and 420, front contacts of relays 424 and 440, conductor 368, wiper 320 of the register selector, back contact of relay 341, front contacts of relays 334 and 339, back contacts of relays 342 and 347, winding of relay 342 to battery in the register circuit. Relay 342 operates to record the busy condition and to open the circuit to the holding relay 400 via wiper 322 causing the register circuit to restore.

When relay 400 releases the general holding ground for the register is removed and all relays release. The units marker switch is restored to normal from ground interrupter contact of magnet 405, a back contact of relay 438, wiper 414, back contact of relay 437, winding of magnet 405 to battery. The units marker switch self-steps until the wipers are in their normal position when this circuit is opened.

The tens marker switch restores from ground, interrupter contact of magnet 404, back contacts of relays 437 and 438, wiper 411, back contact of relay 443, winding of magnet 404 to battery. The magnet self-steps in this circuit until the wipers are restored to normal.

The hundreds marker switch restores in a circuit from ground, back contact of relay 437, interrupter contacts of magnet 403, back contacts of relays 438 and 400, wiper 408, back contact of relay 400, winding of magnet 403 to battery. The magnet 403 self-steps the wipers to normal in this circuit.

When wipers 406, 409 and 412 are normal the condition for hunting is established from battery, resistance 403, wipers 406, 409 and 412 in their normal positions, back contact of relay 400, contact of jack 444, to conductor 373. Until this circuit is restored the register is unavailable.

If the called line is the first line of a P. B. X group, and is busy, the inductive winding of the cutoff relay 205 is shunted by a resistance, not shown. When the held line is busy because of a resistance connected to ground in a local or trunk link, there will be sufficient test potential to operate relay 422 and relays 423 and 420 operate in turn. Relay 420 removes the short circuit on resistance 421, causing relay 422 to release. The release of relay 422 connects ground, contacts of relays 429, 422, front contacts of relay 420 and a back contact of relay 426, winding of relay 419 to battery and releases relays 423 and 420. The operation of relay 419 opens the operating circuit of relay 424. The release of relay 420 operates relay 426 from a contact of relay 419. Relay 426 connects direct ground to relay 525 and clutch magnet 517 of the local link (see Fig. 2), via back contacts of relays 429, 422 and 420, a front contact of relay 426, back contact of relay 427, front contacts of relays 440 and 445, conductor 371, wiper 323 of the register selector, through the register link circuit, brush 303 of the register link line finder, conductor 217, brush 503 of the local line finder to operate relay 525 in the local link.

When a free P. B. X line is encountered, relay 422 operates via conductor 372, wiper 324 of the register selector and brush 512 of the selector in the previously described circuit, operates relays 423 and 420 and opens the ground circuit to relay 525 and clutch magnet 517 of the selector. The operation of relay 420 closes the operating circuit for relay 424, via relays 426 and 417. When relay 424 operates, a free line signal is sent to the register link and the register is restored as previously described.

If no line of the P. B. X group is free, sufficient test potential is connected to wiper 324 of the register selector, when the last line of the group is reached, to operate relay 422 because the cutoff relay 205 of the last line of a P. B. X group is shunted by a resistance the same as the first line of the group. Relays 423 and 420 operate in turn and, if the line is busy, relay 422 releases when the operation of relay 420 inserts resistance 421 in series with the winding of relay 422. The operating circuit for relay 424 is completed by relay 420. Relay 427 then operates from ground via, contacts of relays, back contacts of relays, back contacts of relays 429 and 422 and front contacts of relays 420 and 426. Relays 423 and 420 release after a short delay. The operation of relay 427 closes the operating circuit of relay 424. The operation of relay 424 connects ground via front contacts of relays 427, 424 and 440, conductor 368 to wiper 320 of the register selector to signal to the register link that all P. B. X lines are busy.

When a line busy signal is received in the register link by ground via wiper 320 of the register selector, relay 342 operates as previously described and locks to ground via a back contact of relay 349 and a front contact of relay 326. Relay 342 opens the register holding circuit via wiper 322 of the register selector thereby releasing the register, operates relay 341 which opens connections to the register and connects relay 348 to brush 304 of the link line finder via front contacts of relays 337, 331, 342, and 339. Relay 348 operates in parallel with the grounded resistance of the local or trunk link. In the register link circuit that receives the line busy signal, relay 348 connected to link line finder brush 304 as previously described, is connected via conductor 218, local line finder brush 504 to brush 512 which at that time is connected to conductor 226. Relay 347 operates via front contacts of relays 348 and 342, back contact of relay 349 and front contact of relay 326 to ground and locks. Since this is not a revertive call relay 348 remains operated. Relay 342 releases slowly from a contact of relay 347. Busy tone from the busy tone transformer, not shown, conductor 383, a back contact of relay 309, front contacts of relays 347 and 337 to the primary winding 356 of tone coil 378 is sent to the calling subscriber. The circuit holds until the subscriber releases. When that occurs, relay 327 releases, releasing, in turn, relay 323. Relays 326 and 308 release removing the general holding ground. The marker switch restores from ground, wiper 318, back contacts of relay 326, interrupter contact and winding of magnet 315 to battery after relay 326 releases leaving the register link circuit normal.

9. RECEPTION OF RINGING DIGIT

After the units digit has been recorded as described in section A–5, the ringing digit is recorded only in the register link in the same manner as for the hundreds digit as described in section 3 except that the link marker switch starts from position 11. This operation of the link marker switch proceeds while the register is selecting and testing the called lines as described in sections A-6, A-7 and A-8. Relay 329 operates and holds during the series of impulses. The link marker switch steps to a position from 12 to 21 depending on the number dialed. This provides for lines with a maximum of ten parties and full selective ringing. Five ringing frequencies are used with connection to either line wire 224 or 225 to give full selective ringing.

After the digit is received, relay 329 releases, operating relays 337 or both relays 337 and 312 via brush 316. Relay 337 operates for all codes. Relay 312 operates for codes 6 to 10 to transfer ringing current from line wire 224 to line wire 225. Brush 304 of the link line finder is connected via conductor 218 to brush 504 of the local line finder, through the local link circuit (see Fig. 2) to selector brush 511 and line conductor 225. Link line finder brush 303 is connected via conductor 217, local line finder brush 503, through the local link circuit (see Fig. 2) to selector brush 510 and line conductor 224.

Ringing current from the harmonic ringing conductors 900, wiper 317 of the link marker switch, front contact of relay 337, winding of relay 338, contact of relay 312, and when the relay is not operated through a back contact of that relay a front contact of relay 349, back contact of relay 346, a back contact of relay 342, a front contact of relay 339 to link line finder brush 304. When relay 312 is operated the winding of relay 338 is then connected via a front contact of relay 312, a front contact of relay 349, a back contact of relay 346, front contacts of relays 339 and 326 to link line finder brush 303. The ground return for the ringing circuit may be traced through wiper 318 of the link marker switch position 12 to 21 which connects ground to link line finder brushes 304 or 303 depending upon the position of the switch. For example, when relay 312 is operated wiper 318 is in a position from 17 to 21 and ground is connected over the front contact of relay 349 to brush 304, the ringing current from wiper 317 being at that time connected in series with the winding of relay 338 to link line finder brush 303. The circuit waits until selection is complete and a free or busy signal is received from the register as described in section A-8.

The following table will clarify the ringing conditions of the 10-party harmonic ringing system.

| Party | Ringing frequency | Relays operated | Line Wire |
|---|---|---|---|
| 1 | 33 | 337 | 225 |
| 2 | 50 | 337 | 225 |
| 3 | 66 | 337 | 225 |
| 4 | 16 | 337 | 225 |
| 5 | 25 | 337 | 225 |
| 6 | 33 | 337 and 312 | 224 |
| 7 | 50 | 337 and 312 | 224 |
| 8 | 66 | 337 and 312 | 224 |
| 9 | 16 | 337 and 312 | 224 |
| 10 | 25 | 337 and 312 | 224 |

10. RINGING THE CALLED SUBSCRIBER, ANSWER AND RELEASE OF CONNECTION

If the called line tests free, the register sends a line free signal to the register link and relay 343 operates when ground is removed from the pickup conductor 364 at the beginning of the ringing period. This allows relay 343 to operate at the proper time for code ringing, if used, so that the correct number of rings is sent out when the ringing first starts. Relay 343 operates relays 349 and 341 and connects battery through resistance 344, a front contact of relay 343, a back contact of relay 346, link line finder brush 305 to conductor 219. The holding relay 525 in the local link circuit is operated but the magnet 517 is not. This causes the local link circuit to cut through for ringing. Relay 349 connects the ringing trip relay 338 to the appropriate side of the line and connects ringing tone over conductor 384, front contact of relay 349, back contact of relay 347, front contact of relay 426, primary winding 356 of tone coil 378 to the calling line.

When the called subscriber answers, the line loop is closed, operating the ringing trip relay 338 from battery in the ringing source and ground on brush 318 of the link marker switch. Relay 338 releases relays 308 and 326. Relay 308 removes the general holding ground for the register link and the remaining relays release. The link marker switch is self-stepped to normal from ground, wiper 318, back contacts of relay 326, interrupter contact and winding of magnet 315 to battery, thereby returning the register link to normal until another call is originated.

When the ringing is tripped the register link opens the circuit over conductor 216 to place the local link in the talking condition. The line finder brushes are connected through a bridged impedance type transmission circuit to the final brushes of the local link and the connection is placed under control of the calling and called subscribers.

When the calling subscriber disconnects the local link 111 is released and restores to normal. If the called subscriber has not disconnected the release of the cutoff relay of the called line will place the line circuit in the lockout condition until he disconnects.

B.—*Local call to line in a different line group*

When the subscriber at station 200 wishes to call a subscriber in a different hundred's group, the operations described in section A-1 and A-2 attach a register link to the calling line and a register to the link and the system is now ready to receive dial pulses. It is assumed that line number 3341 is called.

1. LOCAL LINE FINDER ATTACHED

As described in section A-3 the dial pulses step the link marker switch in the register link circuit and the hundred's marker switch in the register to their position 3. When relay 329 releases, relays 330 and 332 operate via wiper 316 of the link marker switch. Relay 331 is not operated indicating that the call is for a line in a different group and relay 431 of the register circuit is not operated at this time.

A local link is attached as described in section A-4. When it is attached and before relay 339 operates, ground from wiper 318 of the link marker switch, front contacts of relays 332, back contacts of relays 331 and 339, brush 304 of the link line finder, conductor 218 and brush 504 of the local link line finder operates relay 530 (see Fig. 2). The operation of relay 530 transfers the link connections from brushes 510 and 511 to brushes 513 and 514, opens the circuit to brush 512 and connects brush 515 to the circuit of the selector, thus utilizing the terminals of the lower half of the selector arc.

2. HUNDRED'S SELECTION

After the first digit is recorded, the local line finder is attached and relay 339 is operated, the register proceeds with hundred's selection and the final selector of the local link is operated as a group selector. Ground from a front contact of relay 400, wiper 406 in position 3 of the hundred's marker switch, back contact of relay 431, front contact of relay 443, back contact of relay 445, conductor 371, wiper 323 of the register selector, back contacts of relays 341, 349, 346, front contacts of relays 339 and 326, brush 303 of the link line finder, conductor 217, brush 503 of the local line finder, operates relay 525 and clutch magnet 517 which rotates the group selector. Revertive pulses from brush 516 of the group selector via the previously described circuit in section A-6 operates relay 429 of the register which, in turn, steps the hundred's marker switch via a back contact of relay 415 and wiper 407.

When the hundred's marker switch reaches position 10, the ground circuit to relay 525 of the local link is opened and relay 428 is operated via brush 406. The group selector continues to rotate from ground via back contacts of relays 429 and 431 which holds relay 525 operated until the next revertive pulse is received and relay 429 operates The group selector is stopped on the first line of the correct group by the operation of relay 429 which operates relay 416. Relay 445 operates and opens the circuit for relay 429 which releases allowing the hundred's marker switch to step to position 11.

When the hundred's marker switch reaches position 11, relay 415 operates and both relays 415 and 445 lock to wiper 406 in position 11 of the hundred's marker switch. Relays 428 and 416 release. The operation of relay 415 connects ground, winding of relay 422, back contacts of relays 420 and 419, front contact of relay 415, conductor 369, wiper 321 of the register selector, back contact of relay 331, front contact of relay 339, back contacts of relays 341 and 346, brush 305 of the link line finder, conductor 219, brush 506 of the local line finder, to brush 515 of the group selector. Ground from back contacts of relays 429, 422 and 420, front contact of relay 415, conductor 371, wiper 323 of the register selector, back contacts of relays 341, 349 and 346, front contacts of relays 339 and 326, brush 303 of the link line finder, conductor 217, brush 503 of the local line finder, operates relay 525 and magnet 517 of the local link. Relay 415 also closes a circuit for operating relay 431 from ground, a back contact of relay 437, front contact of relay 415, a back contact of relay 424 and a front contact of relay 443. Relay 415 also connects the ground from the back contact of relay 437 through back contacts of relays 419 and 426 to operate relay 424. Relay 424 is a slow operating relay, relay 431 opens the operating circuit for relay 429 to allow sufficient time for the selector to rotate from the first trunk position if the trunk is busy.

If the first trunk of the selected group is free, relay 422 operates in series with relay 540' of the selected final selector via brush 515 and conductor 545, winding of relay 540' to battery, and opens the ground circuit to relay 525 and clutch magnet 517 of the selector circuit to stop the rotation of the selector. The operation of relay 422 connects ground from a back contact of relay 429, a front contact of relay 422, a front contact of relay 415, wiper 407 to magnet 403 of the hundred's marker switch. Relay 422 also operates relays 423 and 420 in turn.

The operation of relay 420 inserts resistance 421 in series with the winding of relay 422 which releases and removes ground from magnet 403 of the hundred's marker switch. The marker switch then steps to position 12 and releases relays 445, 515 and 431. Relay 424 operates and short circuits resistance 401 in series with conductor 370 and wiper 322 of the register selector to give the register link a free line signal. This signal is ignored by the register link because the operating winding of relay 343 is short circuited at this time.

The operation of relay 422 removes a short circuit on resistance 425 to prevent clutch magnet 517 from opening and relay 525 operates to connect ground to selector brush 515 to hold relay 540' in the selected final selector and mark the connecting trunk as busy.

If the first trunk of a group is busy, relay 422 does not operate when the trunk is tested. The group selector is rotated by the operation of relay 525 and clutch magnet 517 from ground via relays 429, 422, 423 and 445 of the register circuit. The group selector will rotate until a free trunk is found and relay 422 operates.

Relay 424 which operates slowly, will operate before the last trunk is reached and open the operating circuit for relay 431. The release of relay 431 closes the operating circuit of relay 429. The selector rotates to the first trunk of the next trunk group and relay 429 operates from ground on selector brush 516 through a previously described circuit. The operation of relay 429 removes ground from selector clutch magnet 517 and relay 525 to stop the rotation of the group selector. Relay 429 operates relay 440 which connects ground via relays 426, 420 and 424, conductor 368, wiper 420 of the register selector to operate relay 342 to release the register as previously described in section A-8 for a line busy signal.

3. TENS AND UNITS SELECTIONS

The reception of the second and third digits by the tens and units marker switches and counted by the link marker switch proceeds as described in section A-5.

Connections at this time have been established from the register, via a register link and a local link in which the final selector, functioning as a group selector connects line finder brushes 503 and 504 via selector brushes 514 and 515 respectively, to trunk conductors 544, 545 and 546 incoming to a selected final selector in the different group. Ground from a contact of relay 539 via selector brush 515, conductor 545 of the trunk from the group selector to the final selector of the different group, operates relay 540' of the final selector.

The reference numbers that are primed (') refer to the final selector of the different group which is connected to the group selector over trunk conductors 543, 544 and 545.

The final selector circuit of the different link operates essentially in the same manner as described in sections A-6 and A-7 except that the operation of the selector clutch magnet 517' and relay 525' is controlled over conductor 543 instead of finder brush 503' and revertive pulses for the positioning of the selector are transmitted over conductor 544' instead of finder brush 505'.

4. TEST OF CALLED LINE RINGING, ANSWER AND RELEASE

The test of the called line is made in essentially the same manner as described in section A-8, the test circuit via conductor 218 being connected to conductor 545 via line finder brush 504 and group selector 516 and thence to selector brush 512′ to permit the register to test the dialed line.

After the ringing is tripped and the line conductors of the preceding group selector are connected through the transmission circuit to conductors 544 and 545, which are connected to final selector brushes 510′ and 511′ to complete the connection between the calling and called subscribers for conversation.

The control of the release as described in section A–9 is extended to the final selector by the removal of ground from conductor 545 which releases the group selector circuit.

*C.—Revertive call*

When the dialing subscriber dials for another party on the same line, a revertive call is signaled. The operations described in sections A–1 to A–7 establish connection to the calling line at the final selector. The line called is always tested busy as described in section A–8 and on a call to the same hundred's line group when relay 331 is operated, the operation of relay 342 as described in section A–8, connects relay 348 in a circuit from ground, winding of relay 348, front contacts of relays 337, 331, 342 and 339, link line finder brush 304, conductor 218, local line finder brush 504, through the local link circuit and final brush 512 to conductor 226 and conductor 215 of the called line.

Resistance 355 which is connected to ground by relay 308 is also connected to conductor 215 via brush 302 of the link line finder. Relays 348 and 347 operate in turn. Relay 347 connects a direct ground to brush 302 and conductor 215 which short circuits and releases relay 348. The release of relay 348 signals a revertive call and operates relay 309 which locks. Relay 342 releases slowly from a contact of relay 347 to permit this operation. Relay 309 connects ground from relay 326 via back contacts of relays 336 and 335, a front contact of relay 309 to hold relay 326. The same ground also operates relay 346. Relay 310 is operated from a contact of relay 309 to connect revertive busy tone to the subscriber to signal the revertive call via conductor 385, front contacts of relays 309, 347, 337, primary winding 356 of the tone coil 378. The local link is released by relay 346 which opens the holding circuit from relay 339 to brush 306 of the link line finder.

The ringing digit is recorded as described in sections A–9. The circuit waits until the dialing subscriber releases. When the loop is opened, relays 327, 328 and 308 release. Relay 326 holds from relay 309 and relay 310 operates via relay 308 and locks to relay 346. Relay 310 connects battery through resistance 345 to operate relay 343 through its left hand winding and relay 349 operates. Relay 349 connects ringing current via relays 346 and 308, brushes 300 and 301 of the link line finder to line conductors 213 and 214. It should be noted that only the called party is rung. The calling subscriber picks up his phone when he thinks the called party has answered.

When the subscriber answers, the ringing trip relay 338 operates over the loop. Relays 347, 309, 326, 343 and 349 release in turn. Relays 312, 337, 341, 334, 330 and 331 also release and the link marker switch returns to normal. Relay 346 is very slow in releasing, approximately 4 seconds, due to the network of resistances 351 and 352, and the condenser 350. Revertive tone is sent to the subscriber via relay 349 normal and relay 346 operated to signal the answering subscriber that it is a revertive call and, therefore, he should wait until the calling subscriber picks up. The tone lasts approximately 3 to 4 seconds. Relays 347 and 346 release in turn to return the circuit to normal.

Removal of ground through resistance 355 and brush 302 of the link line finder from conductor 215 releases relay 205 and connects the line and lockout relays, not shown, to line conductors 213 and 214 to supply transmission battery to the subscribers. The line and lockout relays, not shown, release when both parties hang up and the line circuit is restored to normal.

*D.—Outgoing call to operator*

The subscriber at station 200 lifts his receiver and dials "0" on a call to the operator. The operations described in sections A–1, A–2 and A–3 result in attaching a register link and a register to the calling line, positioning the link and the hundred's marker switches in position 10. Relay 333 in the register link operates and relays 330, 331 and 332 do not operate.

The operation of relay 333 of the register link connects the start ground to conductor 359 (see Fig. 2), to operate relay 806, this connects ground to conductor 629 to operate the line finders of the idle trunk links. They continue to rotate until one of them finds the test potential on conductor 216 from battery via resistance 813 and conductor 361 through the register link circuit. The trunk link is then connected to the register link and the register proceeds as in hundreds selection as described in section B–2 to select a trunk to the operator.

The two-way trunk circuit 127 (Fig. 2) is energized to signal the operator when the free trunk signal received from the register via wiper 322 of the register selector operates relays 343 and 349 in turn. Relay 343 connects battery from resistance 344, brush 306 of the link line finder to conductor 216 which operates a relay in the trunk link to signal the trunk to proceed with the completion of the connection.

Relays 343 and 349 release the register link since the holding path for relays 308 and 326 is opened by relay 333, and the calling subscriber is connected to the trunk through the trunk link.

The release of such a connection from a subscriber to the operator takes place in the well known manner and is not here described since it bears no relation to the subject matter of the present invention.

*E.—Incoming call from operator*

On an incoming call from a manual operator the two-way trunk connects the starting potential to conductor 754 to operate relays 801, 802 and 803 of the starting circuit, Fig. 3, in turn. This completes the circuit for the register link line finder magnets 308 of all free register links and connects ground to their test relays 311. As described in sections A–1 and A–2, when a register link line finder brush 306 encounters test potential on conductor 705, it stops the line finder and reduces the starting potential on conductor 705 and all the link line finders stop. A free register is attached to the register link by the register selector.

Ground from the trunk circuit via conductor 703, link line finder brush 303, front contact of relay 326 and back contact of relay 339 operates relay 335 to prepare the register link circuit for an incoming call. Relay 335 locks to ground at a contact of relay 326. The operation of relay 308 connects ground via resistance 355, link line finder brush 302, conductor 702 and a contact of relay 736 to operate relay 735 which locks to conductor 702. The two-way trunk circuit is adjusted to receive dial pulses from the operator via conductors 700 and 701 and reverses the polarity of the trunk conductors 710 and 711 to indicate to the operator that dialing may begin.

1. RECEPTION OF THE FIRST, SECOND AND THIRD DIGITS

It is assumed that the operator dials line number 2341. At this time the register link and the register are attached to the trunk. The register link is prepared to operate on an incoming trunk call. When the operator calls subscribed 2341 the dial pulses are repeated to relay 327 of the register link by opening the bridge in the trunk circuit on conductors 700 and 711. A marker switch, not shown in the trunk circuit, steps with the pulses and distinguishes between assigned and unassigned hundreds' groups. The trunk circuit repeats only the first, second and third digits which are recorded in the register link and the register. The pulses of the fourth or ringing digit are recorded on the marker switch of the trunk circuit and do not step the register marker switch in the register link. Since the operation of the marker switch in the trunk circuit is not related to the present invention it is omitted to simplify this description.

The pulses are received by relay 327 of the register link and repeated to the register over the instepping circuit as described in section A-3 for the first digit and section A-5 for the ten's and unit's digits. The link marker switch in the register link and the hundred's ten's, and unit's marker switches in the register are positioned.

If the trunk marker switch is stepped to a position corresponding to an unassigned hundred's group, the trunk circuit is held in this condition until the register link releases as described in section A-3 for the receipt of an unassigned first digit.

2. TEN'S SELECTION OF A CALLED LINE IN THE SAME HUNDRED'S GROUP

A free trunk link line finder is attached substantially as described in section D due to the operation of relay 335 which transfers the starting ground from conductors 358 to 359 and the line finder test potential from conductors 360 to 361, removes the alternate holding paths for relays 308 and 326 and closes the short circuiting path for relay 343.

After reception of the first digit, the register link connects ground to wiper 321 of the register selector to operate relay 431 as described in section A-3. Relay 431 opens the circuit for relay 429, opens the circuit to conductor 371 and wiper 323 to prevent operation of the final selector, removes ground from wiper 408 terminal 12 of the hundred's marker switch, and completes a circuit from ground, interrupter contact of magnet 404, front contact of relay 437, interrupter contact of magnet 403, front contacts of relays 438 and 431, wiper 408 of the hundred's marker switch, front contact of relay 431, back contact of relay 415, magnet 403 to battery, to self-step the hundred's maker switch to position 12. This cancels the hundred's selection and prepares the circuit for ten's selection. Relay 431 remains operated for sufficient time to insure the stepping of the hundred's marker switch.

The revertive impulse control circuit is now closed from ground, a contact of relay 400, wiper 406 in position 12 of the hundred's marker switch, front contact of relay 437, wiper 409 in position 3 of the ten's marker switch, back contact of relay 431, front contact of relay 443, back contact of relay 445, conductor 371, wiper 323 of the register selector, back contacts of relays 341, 349 and 346, front contacts of relays 339 and 326 of the register link circuit, brush 303, conductor 703, trunk line finder brush 603 to operate relay 618 and clutch magnet 617. The finder brushes rotate to make the selection of the ten's group. At this stage of the connection conductor 703 is open in the trunk and relay 339 of the register link, Fig. 3, is operated.

Ground pulses marking the beginning of each ten's group are sent to the register via final selector brush 616, through the trunk link finder brush 604, conductor 704, link line finder brush 304, front contact of relay 339, back contacts of relays 342, 346, 349 and 341, register selector wiper 324, conductor 372, back contacts of relays 445 and 430, winding of relay 429, back contacts of relays 430 and 431, front contact of relay 443, resistance 442 to battery. Relay 429 operates and closes a ground to operate magnet 404 of the ten's marker switch via back contacts of relays 429 and 415, wiper 407 in position 12 of the hundred's marker switch, and a front contact of relay 437. The same contact of relay 429 also operates relay 433 which locks to ground via interrupter contact of magnet 404, front contact of relay 437, interrupter contact of magnet 403 and front contacts of relays 438 and 433 to insure that magnet 404 will take one step for each revertive pulse, however short, received.

When the ten's marker switch reaches position 10, ground from a front contact of relay 400, wiper 406 position 12 and wiper 409 position 10, operates relay 428. On the next operation of relay 429, magnet 404 is energized, relay 416 is operated via a contact of relay 428, and fundamental ground is opened from wiper 324 of the register selector for releasing relay 618 and clutch magnet 617 of the trunk link via conductor 703. Relay 445 operates from contact of relay 428 and opens the fundamental circuit from brush 324 of the register selector to release relay 429. The release of relay 429 de-energizes magnet 404 stepping the ten's marker switch to position 11 and opens the circuit for relay 416. When the ten's marker switch steps to position 11, relay 428 is released and a short time later relays 416 and 445 release in turn. The register circuit is then prepared for units selections.

The release of relay 618 and clutch magnet 617 stops the selector on the ten's group as selected by the ten's marker switch. In this illustration, the ten's marker switch stepped from position 3 where it was set by the dial pulses, to position 11 where it was driven by the revertive pulses from brush 616 of the selector.

3. UNIT'S SELECTION

As described in section A-7, when an odd number is dialed for the units digit, relay 430 is operated when the ten's marker switch steps to position 11 and relay 429 responds to battery pulses from selector brush 616. For even numbered units digits, relay 430 is not operated and relay 429 responds to ground pulses from selector brush 616. The release of relay 445 at the end of ten's selection again connects ground to wiper 323 of the register selector and in this example responds to revertive ground pulses since the units digit dialed is "4" and the units marker switch is in position 4.

The revertive impulse control circuit is now closed over the previously described circuit from ground front contact of relay 400, wiper 406 of the hundreds marker switch position 12, front contact of relay 437, wiper 409 of the tens marker switch position 11, back contacts of relays 440 and 431, front contact of relay 443, back contact of relay 445, conductor 371, wiper 323 of the register selector, back contacts of relays 341, 349 and 346, front contacts of relays 339 and 326, brush 303 of the link line finder, conductor 703, brush 603 of the trunk line finder, to operate relay 618. Clutch magnet 637 is then operated to rotate the selector brushes.

As the selector rotates the revertive ground pulses, in this example, from selector brush 616, through the trunk link circuit, trunk finder brush 604, conductor 704, brush 304 of the link line finder, front contact of relay 339, back contacts of relays 342, 346, 349 and 341, wiper 324 of the register selector, conductor 372, back contacts of relays 445 and 430, winding of relay 429, back contacts of relays 430 and 431, front contact of relay 443, resistance 442 to battery, operates relay 429. The ten's marker switch is again stepped by relay 429 until relay 440 is operated. Magnet 404 operates from ground, front contact of relay 429 and back contact of relay 415, wiper 407 in position 12 of the hundred's marker switch, front contact of relay 437, magnet 404 to battery. Relay 440 operates from ground, a front contact of relay 400, wiper 406 in position 12 of the hundred's marker switch, front contact of relay 437, wiper 410 in position 14, in this example, of the ten's marker switch, wiper 413 in position 4 of the units marker switch, winding of relay 440 to battery. The operation of relay 440 connects ground, front contact of relay 400, wiper 406 position 12, front contact of relay 437, wiper 409 positions 11—15, a front contact of relay 440, to operate relay 428 and places the fundamental ground under control of relay 429 because ground remains connected to conductor 371 from back contacts of relays 429 and 431 and a front contact of relay 443.

Ground from front contacts of relays 400 and 440 and a back contact of relay 416, operates relay 417 which connects ground via back contacts of relays 419 and 426 to the winding of slow operating relay 424. The next operation of relay 429 from ground on brush 616 of the selector, removes ground from conductor 371 and relay 618 and magnet 617 release, stopping the selector. Relay 429 operates relay 416 via a front contact of relay 428. Relay 416 operates relay 445 in an obvious circuit and releases relay 429, closes a circuit from ground, winding of relay 422, back contacts of relays 420 and 419, front contacts of relays 440 and 445 to conductor 372 for testing the busy or idle condition of the called subscriber's line, and connects ground via resistance 441 and front contacts of relays 440 and 445 to conductor 371 for operating relay 618 but not magnet 617 of the final selector. Relay 445 locks to ground at a front contact of relay 417. The release of relay 429 releases relay 416. The register circuit now proceeds to test the called subscriber's line.

4. TEST OF CALLED LINE

When relay 618 in the trunk link releases, the line cutoff relay 205 is connected via conductor 226, selector brush 612, through the trunk link line finder brush 604, conductor 704, link line finder brush 304, front contact of relay 339, back contacts of relays 342, 346, 349 and 341, wiper 324 of the register selector, conductor 372 to the previously described circuit through front contacts of relays 445 and 440, back contacts of relays 419 and 420 and winding of relay 422 to ground.

If the selected line is free, a test potential on selector brush 612 operates relay 422 which operates relays 423 and 420 in turn. When slow operating relay 424 finally operates, resistance 401 in series with relay 400, conductor 370 and wiper 322 of the register selector is short circuited via a contact of relay 420 to send the line free signal to the register link.

If the selected line is busy, there will be no test potential on selector brush 612 and relay 422 does not operate. When relay 424 finally operates, ground is connected to conductor 368 and wiper 320 of the register selector, because relay 420 is not operated, via back contacts of relays 326 and 320, front contacts of relays 324 and 340 to send the line busy signal to the register link.

When the register link circuit receives a line free or busy signal, relay 343 or relay 342 is operated to release the register and register link after signaling the two-trunk circuit and the trunk link.

5. CALLED LINE TESTS FREE

The operation of the final selector of the trunk link is similar to that of the final selector of a local link. The two-way trunk controls the connection after the register link is released and rings the called line or sends the busy signal to the operator and provides the transmission circuit for talking. When relay 445 of the register circuit operates on the last operation of relay 429 and connects ground through resistance 441 momentarily to conductor 371 and wiper 323 of the register selector, this ground via conductor 703, trunk line finder brush 603 operates relay 618 but not clutch magnet 617.

The line free signal relay 343 connects resistance 344 from ground via brush 305 of the link line finder, conductor 706 and trunk line finder brush 606 to cause the trunk link to connect the trunk circuit from conductors 700 and 701 via trunk line finder brushes 600 and 601 and selector brushes 610 and 611 to line conductors 223 and 224. Ground via resistance 639 and selector brush 612 is connected to conductor 224 to hold the called line busy.

In the two-way trunk and ground through resistance 344, brush 305 of the link line finder and conductor 706 also connects ringing current to conductors 700 and 701 and, through the trunk link, to conductors 223 and 224 of the desired line. Ring back tone is connected to trunk conductors 710 and 711.

6. CALLED LINE TESTS BUSY

If the selected line tests busy, relay 342 is operated in the register link circuit and connects low resistance 340 from battery, front contacts of relays 342 and 335, back contact of relay 346, link line finder brush 305, conductor 706, line finder brush 606 of the trunk link to pass the line busy signal to the trunk link. A relay, not shown, in the trunk link is operated and held from grounded line conductor 226 via selector brush 612 to connect ground to line finder brush 603 of the trunk link and conductor 703.

In the two-way trunk circuit battery via resistance 340 causes the trunk link to send a flashing signal by reversing the polarity of trunk conductors 710 and 711 to indicate to the operator that the desired line is busy. The operator may now release or monitor the line.

If the operator desires to monitor a busy line, she dials 1 to connect trunk conductors 710 and 711 to conductors 700 and 701, thus permitting the operator to monitor the call. When the line becomes free ground is removed from conductor 703 and connection is established to the called line as on a call to a free line.

The operation of the final selector and the register on calls to P. B. X groups is the same as described for the local link.

7. RINGING

The digit pulses for the fourth digit are recorded in the trunk and the trunk marker switch (not shown) is stepped to the proper position for applying the selected ringing current to the line.

8. CALL TO A LINE IN A DIFFERENT LINE GROUP

If the called line is one of a different group from the line group to which the two-way trunks are connected, the final selector of the trunk link is operated as a group selector to select a final selector of the line group, in which the called line is located. The operation of the register and the register link is similar to that previously described in section B for a local call to a subscriber's line in a different line group. After selection is completed and the called line is tested, if the called line is free, a line free signal is sent to the trunk circuit through the register link and the register and the register link are released, the busy signal being given to the operator by the trunk circuit. If the called line is free, the line free signal is sent to the trunk circuit and the operator is advised by the flashing signal that the line is free. The trunk circuit then proceeds to ring the called party.

F.—*Time release*

Provision is made for releasing the register link if it is held for an undue length of time. Relay 336 of the register link is operated via a make contact of the linkholding relay 326 and conductor 366 to a timing interrupter which momentarily closes to ground in 2 minute intervals. Relay 336 locks to ground from wiper 318 in the offnormal positions 1 to 11 of the link marker switch via a front contact of relay 326, a back contact of relay 337 and a front contact of relay 336. Operated relay 336 connects ground interrupted once per minute from conductor 367, a back contact of relay 335 and a front contact of relay 327 to hold relay 328. The two interrupters are so synchronized that a delay of from 40 to 60 seconds is provided. The locking circuit for relay 336 is opened each time a digit is dialed, thus providing another timing period.

When the time release occurs, relays 328, 326 and 308 release, in turn, restoring the register link to normal and sending the subscriber's line circuit to the lockout condition.

While we have described above the principles of our invention in connection with specific apparatus, it is to be clearly understood that this description is made only by way of example and not as a limitation to the scope of our invention.

What is claimed is:

1. In an automatic telephone system, subscribers' lines, connecting links comprising line finders and selectors, register links comprising line finders and register selectors, registers for controlling selection, means in response to a call from a calling line for connecting a register link and a register to the calling line, means in each register link responsive to dial impulses received therein for connecting a connecting link to the calling line via its line finder, means controlled by the register for connecting said connecting link via its selector to the called line, means in the register to test the busy or idle condition of the called line, and means in said register link for transmitting busy tone to the calling subscriber when the called line is busy.

2. In an automatic telephone system, a plurality of subscribers' lines including calling dials, a plurality of line connecting links each comprising a line finder and a final selector, a plurality of register links each comprising a line finder, a link marker switch, a busy signal relay and a register selector switch, a plurality of registers each comprising hundred's, ten's and unit's marker switches and a line test relay, means for attaching one of the register links to a calling subscriber's line and for connecting one of the registers to the attached register link over the register selector switch, means in response to the first digit dialed for attaching one of the line connecting links to the calling line and the register link, means in response to the second and third digits dialed for directively operating said final selector of the attached line connecting link to the terminals of a called subscriber's line, means in the register for connecting the line test relay to the called line for determining its busy or free condition, and means in the event that said called line tests busy for operating said busy signal relay in the register link to send a busy tone to the calling subscriber's line.

3. The system according to claim 2 including means in said register link for releasing the register in response to the operation of said busy signal relay.

4. The system according to claim 2 including means, in the event that said line tests idle, controlled by said register link for disconnecting said register link from the calling line and for connecting the calling line to the called line through said one line connecting link when the called subscriber responds.

5. In an automatic telephone system, subscriber's lines, a local link comprising a line finder and a selector, a register link comprising a line finder and a register selector, a register for controlling selection, means in response to a call for connecting the register link and the register to the calling line over the register link line finder and the register selector, respectively, means responsive to dial impulses for connecting the local link over its line finder to the calling line and over its selector to the called line, means in the register for testing the busy or idle condition of the called line, means in the register link for applying ringing current to the called line when the register tests the called line as idle, and means for disconnecting said register link from the calling line and for connecting the calling line to the called line through said local link when the called subscriber responds.

6. In an automatic telephone system, multiparty subscribers' lines, a local link comprising a line finder and a selector, a register link comprising a line finder, a register selector and a ringing selector, a register for controlling selection to establish a connection from a calling line to a called line over said local link, means in response to a call for connecting the register link to the calling line over the register link line finder for connecting the register to the register link over the register selector, means in said register link responsive to dial impulses for preparing a connection from the local link to the calling line and to the called line over its line finder and selector, respectively, means in the register link for positioning the ringing selector in accordance with dial pulses representing the called station on the called multi-party line, means in the register link for applying ringing current to the called line, and means for disconnecting said register link from the calling line and for connecting the calling line to the called line through the local link when the called subscriber responds.

7. In an automatic telephone system, a plurality of lines, an outgoing trunk, a register link for connecting a register to a calling line, a local link for connecting the calling line to predetermined ones of said lines, a trunk link for connecting the calling line to the outgoing trunk, and means in said register link for operating the local link or the trunk line depending upon the first digit dialed.

8. In an automatic telephone system, a plurality of lines, an outgoing trunk, a register for controlling the establishment of a connection from a calling line to predetermined ones of said lines or to the outgoing trunk, sources of ringing current, a register link for connecting the register to the calling line and for selectively applying ringing current from said sources to a called line, a local link for connecting the calling line to the called line, a trunk link for connecting the calling line to the outgoing trunk, a first means in the register link for operating the local link or the trunk link depending upon the first digit dialed, and a second means in said register link dependent upon said first means for selectively controlling the ringing current.

9. In an automatic telephone system, a plurality of lines, an outgoing trunk, a register for controlling the establishment of a connection from a calling line to a called line when the called line is out of a predetermined group of said lines or to the outgoing trunk, a register link comprising a line finder and a register selector for connecting the register to the calling line, a local link comprising a line finder and a final selector for connecting the calling line to the called line when the called line is one of said group, a trunk link comprising a line finder and a selector for connecting the calling line to the outgoing trunk, means in the register link for operating the line finder of the local link or the line finder of the trunk line link in response to the first digit dialed, a connection between a terminal of the register link line finder, the local line finder and the trunk link line finder corresponding to the calling line, and means in said register link including said connection for causing the line finder of the local link or trunk link to find the terminal corresponding to the calling line.

10. In an automatic telephone system, a plurality of subscribers' lines divided into line groups identified by the first digit of the call numbers of said lines, an outgoing trunk, registers for controlling the establishment of a connection from a calling line to a called line when said called line is one of a predetermined group or to the outgoing trunk, register links associated with each group of subscribers' lines and each comprising a line finder and a register selector for connecting a register to a calling line, local links associated with each group of subscribers' lines and each comprising a line finder and a final selector for connecting a calling line to a called line, trunk links associated with each group of subscribers' lines and each comprising a line finder and a selector for connecting a calling line to the outgoing trunk, means in each register link for operating the line finder of the local link or the line finder of the trunk link in response to the first digit dialed, and means in said register link for releasing said register link when the first digit dialed designates an unequipped group of subscribers' lines.

11. The system according to claim 10 including a connection between a terminal of the register link line finders, the local line finders and the trunk line finders corresponding to a calling line, and means in said register links including said connection for causing the line finder of a local or trunk link to find the terminal corresponding to the calling line.

12. In automatic telephone system, a plurality of lines, an outgoing trunk, a register, a register link comprising a line finder, a marker switch and a register selector for connecting the register to a calling line, a local link for connecting the calling line to a called line when said called line is one of a predetermined group, a trunk link for connecting the calling line to the outgoing trunk, means in the register link for positioning the marker switch in accordance with the impulses of the first digit dialed, and means for operating the local link or the trunk link depending upon the position of said marker switch.

13. In an automatic telephone system, a plurality of subscribers' lines divided into groups identified by the first digit of the call numbers for said lines, an outgoing trunk, registers, register links each comprising a line finder, a marker switch and a register selector for connecting a register to a calling line there being one register link for each group of subscribers' lines, local links for each group of subscribers' lines for connecting a calling line to a called line in that group, trunk links for each group of subscribers' lines for connecting a calling line to the outgoing trunk, means in the register links for positioning the marker switch in accordance with the impulses of the first digit dialed, means for operating the local link or the trunk link depending upon the position of the marker switch and means depending upon the position of said marker switch for releasing said register link when the position of said marker switch designates an unequipped group of subscribers' lines.

14. In an automatic telephone system, a calling line, a called line, a register for controlling the establishment of a connection from the calling line to the called line, a register link including a marker switch and means for connecting the register to the calling line, a local link including means for connecting the calling line to the called line under control of the register, means in the register link for positioning the marker switch in accordance with the impulses of the ringing digit dialed by the calling subscriber, and means in said register link for applying ringing current to the called line as determined by the position of the marker switch.

15. In an automatic telephone system, a calling line, a called line, a register for controlling the establishment of a connection from the calling to the called line, a register link comprising a line finder and a register selector for connecting a register to the calling line, a local link comprising a line finder and a selector for connecting the calling line to the called line under control of the register, means in the register link responsive to dial impulses for connecting its line finder to the calling line and for repeating the dial impulses to the register, means including a marker switch in the register link responsive to dial pulses for applying ringing current to a called line, means in the register for controlling the operation of the local link selector to select the called line, means in said register for testing the free or busy condition of the called line and for transmitting line-free or line-busy signals to the register link, and means in said register link responsive to said signals for transmitting a busy-tone to the calling line when the called line is busy or responsive to said marker switch for operating the means for applying ringing current to said called line when the called line is free.

16. In an automatic telephone system, a calling line, a called line, a register for controlling the establishment of a connection from the calling line to the called line, a register link comprising a line finder and a register selector for connecting the register to the calling line, a local link comprising a line finder and a selector for connecting the calling line to the called line, means in the register link in response to dial impulses for connecting the local link line finder to the calling line, for repeating said dial impulses to the register and for selecting ringing current, means in said register for testing the free or busy condition of the called line and for sending free or busy signals to the register link, and means in said register link responsive to said signals for transmitting a busy-tone to the calling line when the called line tests busy or for applying ringing current to the called line when a free signal is received and connection is established to the called line.

17. In an automatic telephone system, a multiparty calling line, a called line, a register, a register link comprising a line finder and a register selector for connecting the register to the calling line, a local link comprising a line finder and a selector for connecting the calling line to the called line, means in the register link for connecting the local link line finder to the calling line and for connecting the local link selector to the register, means in said register for selectively operating the local link selector and for determining when the selected line is the calling line, and means in said register link for applying a revertive-call-tone to said calling line when said register determines that said selected line is said calling line.

18. In an automatic telephone system, a multiparty calling line, a called line, a register, a register link comprising a line finder and a register selector for connecting the register to the calling line, a local link comprising a line finder and a selector for connecting the calling line to the called line, means in the register link for connecting the local link line finder to the calling line and for connecting the local link selector to the register, means in the register for selectively operating the selector and for determining when the selected line is the calling line, means in the register link for applying a revertive-call-tone to the calling line when the register determines that the selected line is the calling line, and means in said register link for ringing said called party on said calling multi-party line.

19. In an automatic telephone system, a plurality of subscribers' lines including a multi-party calling line and a called line, means associated with each subscribers' line for supplying talking battery thereto, a register for controlling the establishment of connections from the calling line to the called line, a register link comprising a line finder and a register selector for connecting the register to the calling line, a local link comprising a line finder and a selector for connecting the calling line to the called line under control of the register, means in the register link for connecting the local link line finder to the calling line and for connecting said local link selector to the register, and means in the register for recognizing a revertive call from a calling to a called party on the multi-party calling line and for causing said means associated with said calling subscriber's line to supply talking battery to both parties.

20. In an automatic telephone system, subscribers' lines including calling dials for controlling the sending of dial impulses, a local link comprising a line finder and a selector, a register link comprising a line finder, a link marker switch and a register selector, a register comprising a plurality of digit marker switches, means responsive to the initiation of a call for causing said register link to connect to said calling line through said register link line finder and to said register through said register selector, means controlled by said register for controlling selection to establish a connection from a calling line to a called line over the line finder and selector, respectively, of said local link, means in the register link responsive to dial impulses to step the link marker switch and one of the digit marker switches in the register, one step for each dial impulse, and means in said register link in response to a series of dial impulses to step said link marker switch one step for each series of impulses and to step a digit marker switch in said register, one step for each impulse of said series of impulses.

21. In an automatic telephone system, subscribers' lines including calling dials for controlling the sending of dial impulses representing numbers, a local link comprising a line finder and a final selector, a register link comprising a line finder, a register selector, and a register marker switch, a register comprising ten's and unit's marker switches, means responsive to the initiation of a call for causing said register link to connect to said calling line through said register link line finder and to said register through said register selector, means in the register responsive to dial impulses for setting the ten's marker switch and the unit's marker switch, means in the register for selectively operating the final selector of the local link in accordance with the settings of said ten's marker switch to select the group of tens terminals including the called line, and revertive impulse controlled means for causing said ten's marker switch to control final selection in accordance with the odd or even number setting of said unit's marker switch.

22. In an automatic telephone system, subscribers' lines divided into groups, calling dials for the subscribers' lines for controlling the sending of dial impulses representing numbers, outgoing trunks, registers for controlling the selection to establish a connection from a calling to a called line in the same group as the calling line or to an outgoing trunk, register links for each group of subscribers' lines, each register link comprising line finders, link marker switches, a stepping relay, a slow relay and four control relays, means responsive to the initiation of a call for causing the register link associated with the calling line to connect to the calling line through the register link line finder and to a register, local links for each group of line comprising line finders and selectors, trunk links for each group of lines comprising line finders and selectors, circuits for the register links including the stepping relay, the marker switch and the four control relays, means responsive to said control relays for connecting said local link or said trunk link to said calling line, means in the register links for stepping the link marker switch one step for each impulse of the first digit under control of the stepping relay and means in said register link circuit for operating three of said four control relays when said link marker switch is stepped to a position corresponding to the line group with which the calling line is associated.

23. The system according to claim 22 including means in said register link circuit for operating only two of said three relays when said link marker switch is stepped to a position corresponding to other than the one with which the calling line is associated.

24. The system according to claim 22 including means in said register link circuit for operating only the fourth control relay when said link marker switch is stepped to a position designating the outgoing trunk.

25. The system according to claim 22 including means in said register link circuit for releasing said register link when said marker switch is stepped to a position designating an unassigned line group.

26. The system according to claim 22 including means controlled by the operation of one of the three relays operated when the register link-ink marker switch is stepped to a position corresponding to the same line as the calling line for causing said register to suppress selection in accordance with the first digit dialed.

27. In an automatic telephone system, subscribers' lines divided into groups, calling dials for the subscribers' lines for controlling the sending of dial impulses representing numbers, registers comprising stepping relays, selection control relays and digit marker switches, register links, one for each group of subscribers' lines, each link comprising a line finder, a link marker switch, a register selector, a stepping relay and a slow release relay, links for each group of subscribers' lines, each link comprising a line finder and a selector, a circuit for each register link including the stepping relay, the slow-to-release relay and the link marker switch, a circuit for each register including the stepping relay, the selection control relay and the digit marker switches, means in the register link circuit controlled by the stepping relay in response to the dial impulses of the first digit for stepping the link marker switch one step for each impulse of the first digit and to repeat the impulses to the stepping relay of the register circuit, means in said register link circuit for operating said selection control relay of said register circuit in accordance with a predetermined position of each link marker switch, and means for controlling the link associated with the calling line from the register.

28. The system according to claim 27 in which the means for operating the selection relay of the register is a relay operated from a predetermined position of the link marker switch.

29. The system according to claim 27 including means controlled by said selection control relay of the register for preventing selection in accordance with said first digit.

30. In an automatic telephone system, subscribers' lines divided into groups identified by the first digit of the call number, calling dials associated with the subscribers' lines for controlling the sending of dial impulses representing numbers, register links associated with each group of lines, each link comprising a line finder, a link marker switch, a register selector, a stepping relay responsive to dial pulses and a slow-to-release relay, registers comprising a digit marker switch for each digit of the subscribers' line numbers and stepping relays responsive to dial impulses for controlling selection to establish connections from calling to called lines, links associated with each group of lines comprising line finders and selectors, a circuit for each register link including the relays and link marker switch for stepping the marker switch, a circuit for the registers including the instepping relay and the digit marker switches for stepping the marker switches in accordance with the digit impulses, means in said register link circuit for repeating the dial impulses to the stepping relay in a register circuit, means in said register link circuit in response to the dial impulses for stepping said link marker switch under control of said stepping relay one step for each impulse for the first digit dialed and thereafter to step said marker switch under control of said slow relay one step for each series of impulses and means in said register to cause the link associated with the calling line to connect to said calling line and to said called line.

HOWARD G. DUHAMEL.
EDWARD O. CAMPBELL.
RAYMOND A. REED.

REFERENCES CITED

The following references are of record in the file of this patent:

UNITED STATES PATENTS

| Number | Name | Date |
|---|---|---|
| 1,450,321 | Lundell | Apr. 3, 1923 |
| 1,482,618 | Polinkowsky | Feb. 5, 1924 |
| 1,575,140 | Williams | Mar. 2, 1926 |
| 1,646,262 | Schwartz | Oct. 18, 1927 |
| 1,857,833 | Baker | May 10, 1932 |
| 1,900,969 | Wright | Mar. 14, 1933 |
| 2,108,140 | Patterson | Feb. 15, 1938 |
| 2,335,512 | Herrick | Nov. 30, 1943 |
| 2,447,494 | Deakin | Aug. 24, 1948 |